United States Patent
Wang et al.

(10) Patent No.: US 11,689,565 B2
(45) Date of Patent: Jun. 27, 2023

(54) DEVICE MONITORING METHOD AND APPARATUS AND DEREGISTRATION METHOD AND APPARATUS

(71) Applicant: Huawei Technologies Co., Ltd., Shenzhen (CN)

(72) Inventors: Yong Wang, Shenzhen (CN); Li Hu, Shanghai (CN); Jing Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 302 days.

(21) Appl. No.: 16/901,176

(22) Filed: Jun. 15, 2020

(65) Prior Publication Data
US 2020/0314140 A1 Oct. 1, 2020

Related U.S. Application Data

(63) Continuation of application No. PCT/CN2019/084382, filed on Apr. 25, 2019.

(30) Foreign Application Priority Data

May 24, 2018 (CN) .......................... 201810510495.0

(51) Int. Cl.
*H04L 9/40* (2022.01)
*H04W 24/08* (2009.01)
(Continued)

(52) U.S. Cl.
CPC ....... *H04L 63/1458* (2013.01); *H04W 12/122* (2021.01); *H04W 24/08* (2013.01); *H04W 60/06* (2013.01)

(58) Field of Classification Search
CPC .......... H04L 63/1458; H04L 2463/144; H04L 67/52; H04W 12/122; H04W 24/08;
(Continued)

(56) References Cited

U.S. PATENT DOCUMENTS

| 2002/0002686 A1 | 1/2002 | Vange et al. |
| 2010/0154057 A1* | 6/2010 | Ko ...................... H04L 65/1104 726/13 |

(Continued)

FOREIGN PATENT DOCUMENTS

| CN | 1968280 A | 5/2007 |
| CN | 101959133 A | 1/2011 |

(Continued)

OTHER PUBLICATIONS

3rd Generation Partnership Project, Technical Specification Group Services and System Aspects, Security Aspects of Common API Framework for 3GPP Northbound APIs (Release 15), 3GPP TS 33.122 V0.2.0 (Apr. 2018), 16 pages.

*Primary Examiner* — Mandish K Randhawa
(74) *Attorney, Agent, or Firm* — Slater Matsil, LLP

(57) ABSTRACT

This disclosure provides a device monitoring method and apparatus and a deregistration method and apparatus. The device monitoring apparatus has a capability of obtaining signaling plane data exchanged between a core network element and a terminal device, and after obtaining the signaling plane data, the device monitoring apparatus can determine, by analyzing attribute information of the signaling plane data, a device that may initiate a DoS attack.

16 Claims, 10 Drawing Sheets

(51) Int. Cl.
*H04W 60/06* (2009.01)
*H04W 12/122* (2021.01)

(58) Field of Classification Search
CPC ... H04W 60/06; H04W 12/121; H04W 12/63; H04W 4/70; H04W 12/61
See application file for complete search history.

(56) References Cited

U.S. PATENT DOCUMENTS

| | | | | |
|---|---|---|---|---|
| 2018/0109975 A1* | 4/2018 | Kalliola | ................ | H04W 24/04 |
| 2019/0028866 A1* | 1/2019 | Baek | ................ | H04W 4/50 |
| 2020/0252813 A1* | 8/2020 | Li | ................ | G06Q 20/382 |
| 2020/0412755 A1* | 12/2020 | Jing | ................ | H04L 63/0218 |

FOREIGN PATENT DOCUMENTS

| | | | |
|---|---|---|---|
| CN | 102523217 A | 6/2012 | |
| CN | 103702382 A | 4/2014 | |
| CN | 104333529 A | 2/2015 | |
| CN | 105337966 A | 2/2016 | |
| CN | 105636049 A | 6/2016 | |
| CN | 105791215 A | 7/2016 | |
| EP | 1986391 A1 | 10/2008 | |
| WO | 2012085696 A1 | 6/2012 | |
| WO | 2017171296 A1 | 10/2017 | |

\* cited by examiner

DEVICE MONITORING METHOD AND APPARATUS AND DEREGISTRATION METHOD AND APPARATUS

CROSS-REFERENCE TO RELATED APPLICATIONS

This application is a continuation of International Application No. PCT/CN2019/084382, filed on Apr. 25, 2019, which claims priority to Chinese Patent Application No. 201810510495.0, filed on May 24, 2018. The disclosures of the aforementioned applications are hereby incorporated by reference in their entireties.

TECHNICAL FIELD

This application relates to the field of communications technologies, and in particular, to a device monitoring method and apparatus and a deregistration method and apparatus.

BACKGROUND

To satisfy massive connections and diversified service requirements, in a 5th generation mobile communications technology (5G) system, a massive machine-type communications (mMTC) application scenario is proposed.

The mMTC application scenario is mainly oriented to devices connected by using the internet of things (IoT). The devices connected by using the IoT may be referred to as IoT devices, for example, a vehicle, a kitchen appliance, and an industrial device. In the mMTC application scenario, there is a large quantity of IoT devices, and locations of the IoT devices are relatively dispersed. As a result, it is difficult to manage the IoT devices together. Once an IoT device is maliciously controlled, for example, a large quantity of IoT devices are maliciously controlled to initiate a denial of service (DoS) attack to a server, a network security problem such as network paralysis may be caused. Therefore, security in a current mMTC application scenario is relatively low.

SUMMARY

Embodiments of this application provide a device monitoring method and apparatus and a deregistration method and apparatus, to improve security in an mMTC application scenario.

According to a first aspect, an embodiment of this application provides a device monitoring method, applied to a device monitoring apparatus. The apparatus may be an application server, a core network element, or the like. The method includes: first obtaining signaling plane data exchanged between a terminal device and a core network element; and then determining, based on attribute information of the signaling plane data, whether the terminal device is a device that initiates a denial of service (DoS) attack.

In the foregoing technical solution, the device monitoring apparatus has a capability of obtaining the signaling plane data exchanged between the core network element and the terminal device, and after obtaining the signaling plane data, the device monitoring apparatus determines, by analyzing the attribute information of the signaling plane data, a device that may initiate a DoS attack, to prevent occurrence of the DoS attack, thereby improving security performance of an mMTC application scenario.

In a possible design, the attribute information includes an amount of the signaling plane data and/or a length of the signaling plane data.

In the foregoing technical solution, the device monitoring apparatus may determine, by using a plurality of parameters, whether the terminal device is a device that initiates a DoS attack, so that flexibility of the device monitoring apparatus can be improved.

In a possible design, if the attribute information includes the amount of the signaling plane data, and the amount of the signaling plane data is greater than or equal to a threshold, it is determined that the terminal device is a device that initiates a DoS attack.

In the foregoing technical solution, the device monitoring apparatus may determine, based on a value relationship between the amount of the signaling plane data and the threshold, whether the terminal device is a device that initiates a DoS attack. The method is simple, and load of the device monitoring apparatus can be reduced.

In a possible design, if the attribute information includes the length of the signaling plane data, and the length of the signaling plane data is greater than or equal to a preset length, it is determined that the terminal device is a device that initiates a DoS attack.

In the foregoing technical solution, the device monitoring apparatus may determine, based on a value relationship between the length of the signaling plane data and the preset length, whether the terminal device is a device that initiates a DoS attack. The method is simple, and load of the device monitoring apparatus can be reduced.

In a possible design, before it is determined that, based on the attribute information of the signaling plane data, that the terminal device is a device that initiates a DoS attack, location information of the terminal device may be further obtained; and then it is determined, based on the location information and the attribute information of the signaling plane data, that the terminal device is a device that initiates a DoS attack.

In the foregoing technical solution, the device monitoring apparatus may determine, with reference to other information of the terminal device, for example, the location information of the terminal device, whether the terminal device is a device that initiates a DoS attack, so that accuracy of a determining result can be improved, and misjudgment can be prevented.

In a possible design, after it is determined that, based on the attribute information of the signaling plane data, that the terminal device is a device that initiates a DoS attack, the device monitoring apparatus sends first indication information to the core network element, where the first indication information is used to instruct the core network element to initiate a deregistration procedure for the terminal device.

In the foregoing technical solution, after the device monitoring apparatus determines that the terminal device is a device that initiates a DoS attack, the core network element may initiate the deregistration procedure for the terminal device, to prevent the DoS attack initiated by the terminal device, thereby ensuring normal access of another terminal device.

According to a second aspect, an embodiment of this application provides a deregistration method, applied to a core network element. The method includes: first obtaining, by the core network element, signaling plane data exchanged between M terminal devices and the core network element; and deregistering N terminal devices when received signaling plane data of each of the N terminal devices in the M terminal devices includes a first type of signaling plane data, where M is a positive integer, N is an integer greater than or equal to 0, and M is greater than or equal to N.

In the foregoing technical solution, the core network element may deregister a terminal device that sends a specific type of signaling plane data. The specific type may be a type that can cause a DoS attack, for example, the first type of signaling plane data. In this way, the DoS attack caused by this type of signaling plane data can be prevented in time, thereby improving security performance of an mMTC application scenario.

In a possible design, the first type of signaling plane data is signaling plane data that is received within a unit time and whose amount is greater than or equal to a threshold.

In the foregoing technical solution, the core network element may determine the first type based on the signaling plane data sent by the M terminal devices. A processing manner is flexible.

In a possible design, after the N terminal devices in the M terminal devices have been deregistered, the core network element sends a first message to an application server, where the first message is used to indicate that the N terminal devices have been deregistered.

In the foregoing technical solution, the core network element may send a processing result for the N terminal devices to the application server, so that the application server analyzes, based on the processing result, information about the terminal devices that may initiate a DoS attack.

In a possible design, after sending the first message to the application server, the core network element receives second indication information, where the second indication information is used to instruct to register N-K terminal devices, and K is an integer less than or equal to N.

In the foregoing technical solution, after the core network element sends the processing result for the N terminal devices to the application server, the application server may analyze the processing result of the core network element with reference to other information, to determine whether the N terminal devices are devices that initiate a DoS attack; and if the N terminal devices are not devices that initiate a DoS attack, the N terminal devices are registered, so that determining accuracy can be improved.

According to a third aspect, an embodiment of this application provides a device monitoring method, applied to an application server. The method includes: receiving, by the application server from a core network element, a first message used to indicate that the core network element has deregistered N terminal devices; and then determining, based on the first message and location information of the N terminal devices, that K terminal devices in the N terminal devices are devices that initiate a denial of service DoS attack, where N is a positive integer, K is an integer greater than or equal to 0, and K is less than or equal to N.

In the foregoing technical solution, after receiving a processing result of the core network element for the N terminal devices, the application server may analyze the processing result of the core network element with reference to other information, for example, location information, to determine whether the N terminal devices are devices that initiate a DoS attack, thereby improving determining accuracy.

In a possible design, if the K terminal devices are located at locations at which a probability that the K terminal devices are attacked by a third party is greater than a preset probability, the application server determines that the K terminal devices are devices that initiate a DoS attack.

In the foregoing technical solution, the application server may determine, based on the probability that the location of the terminal device is attacked by the third party, whether the terminal device is a device that initiates a DoS attack. A processing manner is simple.

In a possible design, N is greater than K. After determining that the K terminal devices are devices that initiate a DoS attack, the application server sends second indication information to the core network element, where the second indication information is used to instruct the core network element to initiate a registration procedure for N-K terminal devices.

In the foregoing technical solution, the application server may analyze the processing result of the core network device with reference to other information, to determine that the K terminal devices in the N terminal devices are not devices that initiate a DoS attack, and then register the terminal devices that do not initiate a DoS attack, thereby improving determining accuracy.

According to a fourth aspect, an embodiment of this application provides a device monitoring apparatus. The apparatus may be an application server or a core network element, or may be an apparatus in an application server or a core network element. The apparatus may include an obtaining unit and a processing unit, and the modules may perform corresponding functions in any design example according to the first aspect.

The obtaining unit is configured to obtain signaling plane data exchanged between a terminal device and a core network element.

The processing unit is configured to determine, based on attribute information of the signaling plane data, whether the terminal device is a device that initiates a denial of service DoS attack.

In a possible design, the attribute information includes an amount of the signaling plane data and/or a length of the signaling plane data.

In a possible design, if the attribute information includes the amount of the signaling plane data, the processing unit is specifically configured to: if the amount of the signaling plane data is greater than or equal to a threshold, determine that the terminal device is a device that initiates a DoS attack.

In a possible design, if the attribute information includes the length of the signaling plane data, the processing unit is specifically configured to: if the length of the signaling plane data is greater than or equal to a preset length, determine that the terminal device is a device that initiates a DoS attack.

In a possible design, the obtaining unit is further configured to obtain location information of the terminal device; and the processing unit is specifically configured to: determine, based on the location information and the attribute information of the signaling plane data, that the terminal device is a device that initiates a DoS attack.

In a possible design, the apparatus further includes: a sending unit, configured to send first indication information to the core network element, where the first indication information is used to instruct the core network element to initiate a deregistration procedure for the terminal device.

According to a fifth aspect, an embodiment of this application provides a deregistration apparatus. The apparatus may be a core network element, or may be an apparatus in a core network element. The apparatus may include an obtaining unit and a processing unit. The modules may perform corresponding functions in any design example according the second aspect, specifically as follows.

The obtaining unit is configured to obtain signaling plane data exchanged between M terminal devices and a core network element.

The processing unit is configured to deregister N terminal devices in the M terminal devices, where received signaling plane data of each of the N terminal devices includes a first type of signaling plane data, M is a positive integer, N is an integer greater than or equal to 0, and M is greater than or equal to N.

In a possible design, the first type of signaling plane data is signaling plane data that is received within a unit time and whose amount is greater than or equal to a threshold.

In a possible design, the apparatus further includes: a sending unit, configured to send a first message to an application server, where the first message is used to indicate that the N terminal devices have been deregistered.

In a possible design, the obtaining unit is further configured to: receive second indication information, where the second indication information is used to instruct to register N-K terminal devices, and K is an integer less than or equal to N.

According to a sixth aspect, an embodiment of this application provides a device monitoring apparatus. The apparatus may be an application server, or may be an apparatus in an application server. The apparatus may include a receiving unit and a processing unit. The modules may perform corresponding functions in any design example according to the third aspect, specifically:

The receiving unit is configured to receive a first message from a core network element, where the first message is used to indicate that the core network element has deregistered N terminal devices.

The processing unit is configured to determine, based on the first message and location information of the N terminal devices, that K terminal devices in the N terminal devices are devices that initiate a denial of service DoS attack, where N is a positive integer, K is an integer greater than or equal to 0, and K is less than or equal to N.

In a possible design, the processing unit is specifically configured to: when the K terminal devices are located at locations at which a probability that the K terminal devices are attacked by a third party is greater than a preset probability, determine that the K terminal devices are devices that initiate a DoS attack.

In a possible design, N is greater than K, the apparatus further includes a sending unit, and the sending unit is configured to: after it is determined that the K terminal devices are devices that initiate a DoS attack, send second indication information to the core network element, where the second indication information is used to instruct the core network element to initiate a registration procedure for N-K terminal devices.

According to a seventh aspect, an embodiment of this application provides a device monitoring apparatus. The apparatus includes a processor, configured to implement the method according to the first aspect. The apparatus may further include a memory, configured to store a program instruction and data. The memory is coupled to the processor. The processor may invoke and execute the program instruction stored in the memory, to implement the method according to the first aspect. The apparatus may further include a communications interface, and the communications interface is used by the apparatus to communicate with another device. For example, the another device is a core network element.

In a possible design, the apparatus includes: a communications interface, configured to obtain signaling plane data exchanged between a terminal device and a core network element; a memory, configured to store a program instruction; and a processor, configured to determine, based on attribute information of the signaling plane data, whether the terminal device is a device that initiates a denial of service DoS attack.

In a possible design, the attribute information includes an amount of the signaling plane data and/or a length of the signaling plane data.

In a possible design, if the attribute information includes the amount of the signaling plane data, the processor is specifically configured to: if the amount of the signaling plane data is greater than or equal to a threshold, determine that the terminal device is a device that initiates a DoS attack.

In a possible design, if the attribute information includes the length of the signaling plane data, the processor is specifically configured to: if the length of the signaling plane data is greater than or equal to a preset length, determine that the terminal device is a device that initiates a DoS attack.

In a possible design, the communications interface is further configured to obtain location information of the terminal device; and the processor is specifically configured to: determine, based on the location information and the attribute information of the signaling plane data, that the terminal device is a device that initiates a DoS attack.

In a possible design, the communications interface is further configured to send first indication information to the core network element, where the first indication information is used to instruct the core network element to initiate a deregistration procedure for the terminal device.

According to an eighth aspect, an embodiment of this application provides a deregistration apparatus. The apparatus includes a processor, configured to implement the method according to the second aspect. The apparatus may further include a memory, configured to store a program instruction and data. The memory is coupled to the processor. The processor may invoke and execute the program instruction stored in the memory, to implement the method according to the second aspect. The apparatus may further include a communications interface, and the communications interface is used by the apparatus to communicate with another device. For example, the another device is a terminal device.

In a possible design, the apparatus includes: a communications interface, configured to obtain signaling plane data exchanged between M terminal devices and a core network element; a memory, configured to store a program instruction; and a processor, configured to deregister N terminal devices in the M terminal devices, where received signaling plane data of each of the N terminal devices includes a first type of signaling plane data, M is a positive integer, N is an integer greater than or equal to 0, and M is greater than or equal to N.

In a possible design, the first type of signaling plane data is signaling plane data that is received within a unit time and whose amount is greater than or equal to a threshold.

In a possible design, the communications interface is further configured to send a first message to an application server, where the first message is used to indicate that the N terminal devices have been deregistered.

In a possible design, the communications interface is further configured to receive second indication information, where the second indication information is used to instruct to register N-K terminal devices, and K is an integer less than or equal to N.

According to a ninth aspect, an embodiment of this application provides a device monitoring apparatus. The apparatus includes a processor, configured to implement the method according to the third aspect. The apparatus may further include a memory, configured to store a program instruction and data. The memory is coupled to the processor. The processor may invoke and execute the program instruction stored in the memory, to implement the method according to the third aspect. The apparatus may further include a communications interface, and the communications interface is used by the apparatus to communicate with another device. For example, the another device is a core network element.

In a possible design, the apparatus includes: a communications interface, configured to receive a first message from a core network element, where the first message is used to indicate that the core network element has deregistered N terminal devices; a memory, configured to store a program instruction; and a processor, configured to determine, based on the first message and location information of the N terminal devices, that K terminal devices in the N terminal devices are devices that initiate a denial of service DoS attack, where N is a positive integer, K is an integer greater than or equal to 0, and K is less than or equal to N.

In a possible design, the processor is specifically configured to: when the K terminal devices are located at locations at which a probability that the K terminal devices are attacked by a third party is greater than a preset probability, determine that the K terminal devices are devices that initiate a DoS attack.

In a possible design, N is greater than K, and the communications interface is further configured to: after it is determined that the K terminal devices are devices that initiate a DoS attack, send second indication information to the core network element, where the second indication information is used to instruct the core network element to initiate a registration procedure for N-K terminal devices.

According to a tenth aspect, an embodiment of this application provides a computer-readable storage medium. The computer-readable storage medium stores a computer program, the computer program includes a program instruction, and when the program instruction is executed by a computer, the computer is enabled to perform the method according to any one of the first aspect or the possible designs of the first aspect.

According to an eleventh aspect, an embodiment of this application provides a computer-readable storage medium. The computer-readable storage medium stores a computer program, the computer program includes a program instruction, and when the program instruction is executed by a computer, the computer is enabled to perform the method according to any one of the second aspect or the possible designs of the second aspect.

According to a thirteenth aspect, an embodiment of this application provides a computer-readable storage medium. The computer-readable storage medium stores a computer program, the computer program includes a program instruction, and when the program instruction is executed by a computer, the computer is enabled to perform the method according to any one of the third aspect or the possible designs of the third aspect.

According to a fourteenth aspect, an embodiment of this application provides a computer program product. The computer program product stores a computer program, the computer program includes a program instruction, and when the program instruction is executed by a computer, the computer is enabled to perform the method according to any one of the first aspect or the possible designs of the first aspect.

According to a fifteenth aspect, an embodiment of this application provides a computer program product. The computer program product stores a computer program, the computer program includes a program instruction, and when the program instruction is executed by a computer, the computer is enabled to perform the method according to any one of the second aspect or the possible designs of the second aspect.

According to a sixteenth aspect, an embodiment of this application provides a computer program product. The computer program product stores a computer program, the computer program includes a program instruction, and when the program instruction is executed by a computer, the computer is enabled to perform the method according to any one of the third aspect or the possible designs of the third aspect.

According to a seventeenth aspect, this application provides a chip system. The chip system includes a processor, and may further include a memory, to implement the method according to the first aspect. The chip system may include a chip, or may include a chip and another discrete component.

According to an eighteenth aspect, this application provides a chip system. The chip system includes a processor, and may further include a memory, to implement the method according to the second aspect. The chip system may include a chip, or may include a chip and another discrete component.

According to a nineteenth aspect, this application provides a chip system. The chip system includes a processor, and may further include a memory, to implement the method according to the third aspect. The chip system may include a chip, or may include a chip and another discrete component.

According to a twentieth aspect, this application provides a system. The system includes the apparatus according to the fifth aspect and the apparatus according to the sixth aspect.

According to a twenty-first aspect, this application provides a system. The system includes the apparatus according to the eighth aspect and the apparatus according to the ninth aspect.

For beneficial effects of the fourth aspect to the twenty-first aspect and the implementations thereof, refer to the descriptions of the beneficial effects of the method according to the first aspect to the third aspect and the implementations thereof.

The following clearly describes the technical solutions in the embodiments of this application with reference to the accompanying drawings in the embodiments of this application.

The technical solutions in the embodiments of this application may be applied to various communications systems, for example, a capability exposure architecture of a 4th generation (4G) system, an NR system, an IoT system, and a next-generation mobile communications system.

In addition, the communications system may further be applicable to a future-oriented communications technology. The systems described in the embodiments of this application are intended to describe the technical solutions in the embodiments of this application more clearly, and constitute no limitation on the technical solutions provided in the embodiments of this application. A person of ordinary skill in the art may learn that, with evolution of network architectures, the technical solutions provided in the embodiments of this application are also applicable to a similar technical problem.

Figure 1:
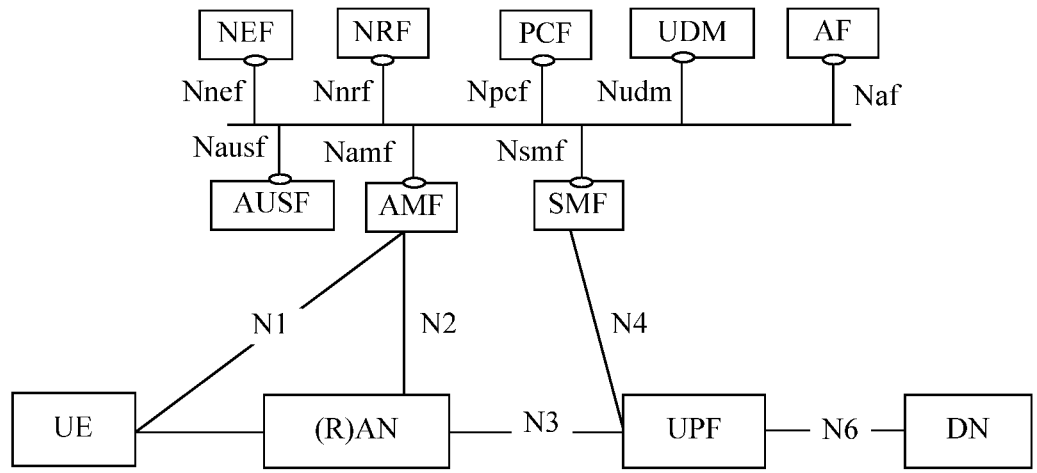
FIG. 1 is a structural diagram of a communications system according to an embodiment of this application.

An application scenario of the embodiments of this application is briefly described below. FIG. 1 is a structural diagram of a communications system according to an embodiment of this application. The technical solutions in the embodiments of this application are applicable to a scenario in which device monitoring is performed on a terminal device and/or a scenario in which a terminal device is deregistered in the communications system.

Some terms in the embodiments of this application are described below, to facilitate understanding of a person skilled in the art.

(i) A network exposure function (NEF) network element is mainly configured to interact with a third party, for example, an over the top (OTT) application, so that the third party may indirectly interact with some network elements in a 3rd generation partnership project (3GPP) network.

(2) An NF repository function (NRF) network element is configured to support network function service registration, status monitoring, and the like, to implement automatic management, selection, and scalability of a network function service.

(3) A policy control function (PCF) network element is configured to: store or generate a session management-related rule, such as a session quality of service (QoS) rule, and provide the rule to a session management function (SMF) entity; and is further configured to generate mobility management-related policy information and provide the information to an access and mobility management function (AMF) entity.

(4) A unified data management (UDM) network element stores subscription information of the terminal device.

(5) An application function (AF) network element is configured to: interact with the PCF entity, and provide a service requirement of a third party to the PCF entity, so that the PCF entity generates a corresponding QoS rule based on the service requirement.

(6) An authentication server function (AUSF) network element is configured to obtain a security authentication vector, and the security authentication vector is used to perform security authentication between the terminal device and a network side.

(7) The AMF network element is configured to perform functions such as authentication on the terminal device, mobility management on the terminal device, network slice selection, and SMF entity selection. The AMF network element interacts with the terminal device by using N1 signaling and interacts with a (radio) access network ((R)AN) by using N2 signaling; sends, to an SMF network element, routing information of an N1 session management (SM) message corresponding to the N1 signaling and routing information of an N2 SM message corresponding to the N2 signaling; and maintains and manages status information the terminal device.

(8) A security anchor function (SEAF) network element is configured to initiate an authentication request to the AUSF entity, to complete authentication performed by the network side on the terminal device.

(9) The SMF network element is configured to: manage all control plane functions of the terminal device, including UPF entity selection, internet protocol (IP) address allocation, session QoS attribute management; obtain a policy control and charging (PCC) rule from the policy control function (PCF) entity; allocates a session resource to a user plane; and the like.

(10) A user plane function (UPF) entity, as an anchor point of a protocol data unit (PDU) session connection, is responsible for data packet filtering, data transmission or forwarding, rate control, charging information generation, and the like of the terminal device.

(11) A data network (DN) entity is configured to: generate downlink data that needs to be sent to the terminal device, and receive uplink data sent by the terminal device.

(12) The (R)AN is connected to the UPF network element by using a user plane interface N3, and is configured to transmit data of the terminal device. An (R)AN network element establishes a control plane signaling connection to the AMF network element by using a control plane interface N2, to implement functions such as radio access bearer control. (R)AN network elements may be access networks using different access technologies, for example, a 3GPP access technology or a non-3rd generation partnership project (non-3GPP) access technology. The (R)AN network element may also be referred to as an access network element, for example, a base station, and may be a gNB (gNodeB) in a new radio (NR) system, or an evolved NodeB (evolutional NodeB, eNB or eNodeB) in a long term evolution (LTE) system, a new radio controller (NR controller), a centralized unit, a radio remote unit, a micro base station, a distributed unit, a transmission reception point (TRP) or a transmission point (TP), a wireless controller in a cloud radio access network (CRAN) scenario; or the network device may be a relay station, an access point, a vehicle-mounted device, a wearable device, a network device in a future evolved public land mobile network (PLMN), or any other radio access device. However, the embodiments of this application are not limited thereto. The access network element allocates an appropriate resource to a user plane transmission path according to a QoS rule provided by the SMF entity.

(14) The terminal device may be a wireless terminal device or a wired terminal device. When performing authentication with another network element such as the AMF entity or the AUSF entity, the terminal device verifies authenticity of a network by using a long-term key and a related function that are stored in the terminal device. A wireless terminal device may be a device that provides a user with voice and/or data connectivity, a handheld device with a wireless connection function, or another processing device connected to a wireless modem. The wireless terminal device may communicate with one or more core networks by using the (R)AN. The wireless terminal device may be a mobile terminal device, such as a mobile phone (also referred to as a "cellular" phone) and a computer with a mobile terminal device, for example, may be a portable, pocket-sized, handheld, computer built-in, or in-vehicle mobile apparatus, which exchanges voice and/or data with the radio access network. For example, the wireless terminal device may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit (SU), a subscriber station (SS), a mobile station (MB), a mobile, a remote station (RS), an access point (AP), a remote terminal (RT), an access terminal (AT), a user terminal (UT), a user agent (UA), a terminal device (UD), or user equipment (UE). The terminal device may alternatively be an IoT device, for example, a home appliance, a vehicle, or an industrial device connected by using the internet of things.

(15) For a DoS attack, an attacker makes, in various manners, a target network stop providing a service or reject resource access. For example, an attacker controls a large quantity of terminal devices to send a same message to a same target network at the same time, causing network congestion. Alternatively, an attacker controls the terminal device to repeatedly send attack repeated service requests or malformed attack data, to make a buffer of a target network overflow, causing paralysis of the target network, or the like.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects, unless otherwise specified.

Names of some technical features in this specification, for example, names of a network element and a concept, are described in the embodiments of this application by using a 4G system and a current 5G system as examples. The names may change with network evolution. For specific evolution, refer to descriptions in a corresponding standard.

It should be understood that the network elements shown in this specification may be physical concepts. For example, the network elements may be physically single devices, or at least two network elements may be integrated into a same physical device. Alternatively, the network elements shown in this specification may be logical concepts, for example, a software module or a network function corresponding to a service provided by each network element. The network function may be understood as a virtualized function in a virtualization implementation, or may be understood as a network function providing a service in a service-based network, for example, a network function specially used to allocate a PDU session resource to a user plane, or a network function specially used to provide a QoS policy to the terminal device. This is not specifically limited in the embodiments of this application.

In an mMTC application scenario, there are a large quantity of IoT devices, for example, vehicles, road infrastructures, tens of millions of smart meters and smart water meters deployed in a large city in an internet of vehicles (boy) system. Therefore, once the IoT devices are maliciously controlled, a network security problem such as network paralysis may be caused.

In view of this, the embodiments of this application provide a device monitoring method and apparatus and a deregistration method and apparatus, to improve security performance of an mMTC application scenario.

The following describes the technical solutions provided in the embodiments of this application with reference to the accompanying drawings. In the following description process, the technical solutions provided in this application are applied to the application scenario shown in FIG. 1.

Figure 2:
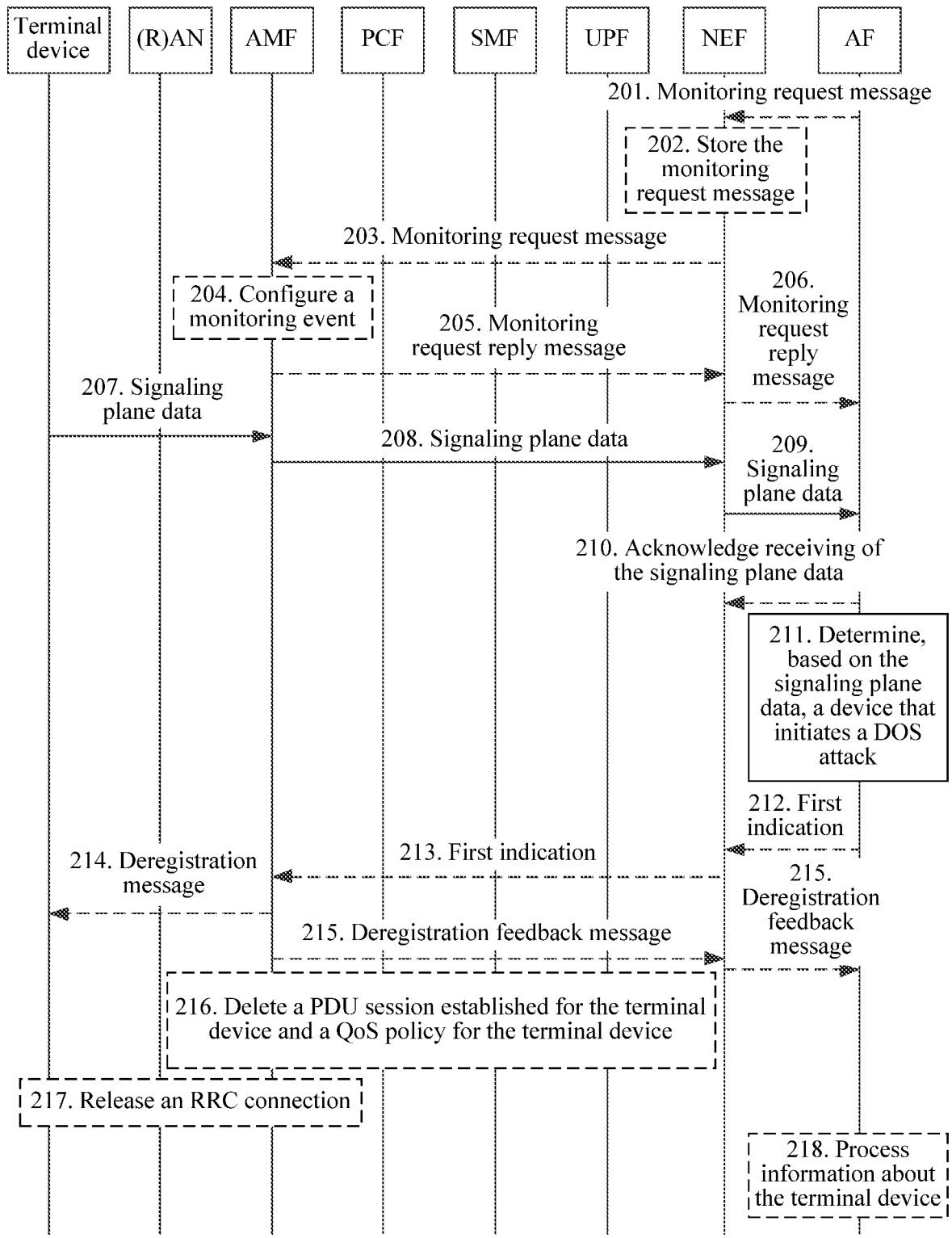
FIG. 2 is a flowchart of a device monitoring and deregistration method according to an embodiment of this application.

FIG. 2 is a flowchart of a device monitoring and deregistration method according to an embodiment of this application. The flowchart is described as follows.

Step 201: The AF network element sends a monitoring request message to the NEF network element, and the NEF network element receives the monitoring request message.

In this embodiment of this application, the monitoring request message is used to configure a monitoring event of a core network element for a terminal device. The monitoring event includes monitoring signaling plane data exchanged between the terminal device and the core network element. For example, attribute information such as an amount, a type, and a data packet length (which may be referred to as a packet length for short) of the signaling plane data exchanged between the terminal device and the core network element may be monitored, or frequency of exchanging the signaling plane data between the terminal device and a core network may be monitored, or certainly, another parameter of the signaling plane data exchanged between the terminal device and the core network element may be monitored. This is not limited herein. In the following descriptions, an example in which the monitoring event is used to monitor the attribute information of the signaling plane data exchanged between the terminal device and the core network element is used.

It should be noted that the core network element in this embodiment of this application may be a single network element shown in FIG. 1, for example, may be another network element such as the AMF network element or the UDM network element. Alternatively, the core network element may be a combination of a plurality of network elements. For example, the core network element may be a combination of the AMF network element and the UDM network element, or may be a combination of the AUSF network element and the AMF network element. Alternatively, the core network element may be a network element corresponding to a service, for example, a network element specially configured to manage the signaling plane data of the terminal device. Alternatively, the core network element may be a combination of network elements corresponding to a plurality of services. This is not limited herein. In the following descriptions, an example in which the core network element is the AMF network element shown in FIG. 1 is used.

In addition, it should be noted that when a plurality of AMF network elements interact with the AF network element, the AMF network element may be one of the plurality of AMF network elements that interact with the AF network element, or may be the plurality of AMF network elements that interact with the AF network element. This is not limited herein. In the following descriptions, an example in which the AMF network element is one of the AMF network elements that interact with the AF network element is used.

The monitoring request message is described below.

In this embodiment of this application, the monitoring request message may include at least one of the following parameters:

(1) a monitoring type, to be specific, the attribute information of the signaling plane data exchanged between the terminal device and the core network element;

(2) monitoring duration, for example, one hour or two hours, where to be specific, the core network element monitors the signaling plane data of the terminal device within a time range of one hour or two hours after receiving the monitoring request message; or the monitoring duration may be understood as a monitoring time range, to be specific, after receiving the monitoring request message, the core network element fixedly monitors the signaling plane data of the terminal device within the monitoring time range; for example, the monitoring time range may be set to a time range, such as 8 a.m. to 6 p.m., in which the terminal device is relatively active; or the monitoring time range may be set to a time range in which a relatively large quantity of terminal devices interact with the core network element; for example, if the AF network element obtains, through counting, that a largest quantity of terminal devices interact with the core network element between 12:00 and 14:00 every day, the monitoring duration is set to 12:00 to 14:00;

(3) a monitoring period, where the monitoring period is, for example, one day or preset duration; for example, when the monitoring duration is one hour, the monitoring period may be set to three hours, so that the core network element monitors the signaling plane data of the terminal device for one hour every three hours; and (4) a monitored object, where the monitored object is, for example, an identifier of the terminal device, for example, a UE_ID used when the terminal device registers with the core network element.

It should be noted that, in this embodiment of this application, the monitoring request message may include one or more of the foregoing four parameters. For example, the monitoring request message includes only the monitoring type. In this case, the AF network element and the core network element may agree on the monitoring duration, the monitoring period, and the monitored object in advance, or after receiving the monitoring request message, the core network element starts to monitor attribute information of signaling plane data of all terminal devices that interact with the core network element, until the AF network element cancels the monitoring event. The monitoring request message may include the monitoring type, the monitoring duration, and the monitoring period, but does not include the monitored object. In this case, after receiving the monitoring request message, the core network element monitors signaling plane data of all terminal devices that interact with the core network element. Examples are not listed one by one herein again. The AF network element may set the parameter in the monitoring request message based on an actual situation. This is not limited herein.

In addition, it should be noted that when the terminal device needs to be monitored, for example, to ensure normal running of the entire system or when it is suspected that a network security problem may exist in the entire system, the AF network element may send the monitoring request message to the NEF network element. Certainly, the AF network element may alternatively send the monitoring request message when the system is set up. This is not limited herein.

Step 202: The NEF network element stores the monitoring request message.

Specifically, after receiving the monitoring request message, the NEF network element decodes the monitoring request message, to obtain content of the monitoring request message. It should be noted that there may be a plurality of AF network elements that interact with the NEF network element. Therefore, when the AF network element sends the monitoring request message to the NEF network element, the monitoring request message may carry identification information of the AF network element, for example, an ID of the AF network element, and may further carry a destination address of an interface for communication between the AF network element and the NEF network element. For example, if a T8 interface is an interface for direct communication between the AF network element and the NEF network element, the monitoring request message may further carry a destination address of the T8 interface. Therefore, after decoding the monitoring request message, the NEF network element stores the ID of the AF network element and/or the destination address of the T8 interface that are/is included in the monitoring request message. In this way, after receiving feedback information from the AMF network element, the NEF network element may accurately send the feedback information to the corresponding AF network element based on the ID of the AF network element and/or the destination address of the T8 interface.

Step 203: The NEF network element sends the monitoring request message to the AMF network element, and the AMF network element receives the monitoring request message.

In an example, an encoding manner used when the AF network element sends the monitoring request message to the NEF network element may be different from an encoding manner used for interaction between the NEF network element and the AMF network element. Therefore, after decoding the received monitoring request message, the NEF network element needs to encode the content of the monitoring request message in the encoding manner used during interaction with the AMF network element, to convert the obtained monitoring request message into a message that can be identified by the AMF network element, and then sends the monitoring request message obtained after the format conversion to the AMF network element. In this way, calculation complexity of the AMF network element can be reduced.

In another example, some monitoring events are preconfigured in the NEF network element and the AMF network element, for example, a monitoring event 1 for monitoring a location of the terminal device, a monitoring event 2 for monitoring the signaling plane data of the terminal device, and a monitoring event 3 for monitoring user plane data of the terminal device. After receiving the monitoring request message, the NEF network element determines that the monitoring event corresponding to the monitoring request message is the same as a preconfigured monitoring event. For example, if the NEF network element determines that the monitoring event in the monitoring request message obtained from the AF network element is the same as the monitoring event 1 configured in the AMF network element, the NEF network element may directly send, to the AMF network element, identification information of the monitoring event 1 configured in the AMF network element. For example, the identification information may be an index number, a number, or the like of the monitoring event 1. In this way, resources occupied when the NEF network element sends the monitoring request message to the AMF network element can be reduced.

Certainly, the NEF network element may alternatively send the monitoring request message to the AMF network element in another manner. This is not limited herein.

Step 204: The AMF network element configures the monitoring event.

After receiving the monitoring request message, the AMF network element stores the content of the monitoring request message, and configures the monitoring event for the signaling plane data of the terminal device based on the parameter in the monitoring request message.

Step 205: The AMF network element sends a monitoring reply message to the NEF network element, and the NEF network element receives the monitoring reply message.

After successfully configuring the monitoring event, the AMF network element sends the monitoring reply message to the NEF network element, to confirm that a monitoring request is accepted. Certainly, if the AMF network element fails to configure the monitoring event, the AMF network element also needs to send a monitoring reply message to the NEF network element, to confirm that the monitoring request is not accepted. In this embodiment of this application, an example in which the AMF network element successfully configures the monitoring event is used.

Step 206: The NEF network element sends the monitoring reply message to the AF network element, and the AF network element receives the monitoring reply message.

After receiving the monitoring reply message sent by the AMF network element, the NEF network element sends, based on the stored ID of the AF network element and interface information, the monitoring reply message to the AF network element that sends the monitoring request message.

It should be noted that step 201 to step 206 are all optional steps, to be specific, are not mandatory.

Step 207: The terminal device sends data to the AMF network element by using a signaling plane, and the AMF network element receives the signaling plane data.

In an example, the data may be sent by using a non-access stratum (NAS) message, or certainly may be sent by using another message. This is not limited herein.

Step 208: The AMF network element sends the signaling plane data to the NEF network element, and the NEF network element receives the signaling plane data.

If step 201 to step 206 are performed before step 208, after receiving the signaling plane data sent by the terminal device, the AMF network element determines that the terminal device is a terminal device monitored by the AF network element, to determine that a monitoring event configured by the AF network element occurs, and sends the received signaling plane data to the NEF network element.

If step 201 to step 206 are not performed before step 208, a manner of processing the signaling plane data sent by the terminal device may be preset in the AMF network element. The processing manner may be that when the signaling plane data sent by the terminal device is detected, the signaling plane data is sent to the AMF network element, so that after receiving the signaling plane data, the AMF network element sends the signaling plane data to the NEF network element.

It should be noted that if the monitored object of the monitoring request message is signaling plane data of all terminal devices that interact with the AMF network element, the AMF network element needs to send, to the NEF network element, the signaling plane data of each terminal device that interacts with the AMF network element. In this case, the signaling plane data of the terminal device that is sent by the AMF network element to the NEF network element may carry identification information of the terminal device, for example, a UE_ID of the terminal device, so that each piece of signaling plane data is associated with the terminal device.

Step 209: The NEF network element sends the signaling plane data to the AF network element, and the AF network element receives the signaling plane data.

Step 210: The AF network element sends an acknowledgment message to the NEF network element, and the NEF network element receives the acknowledgment message.

In this embodiment of this application, the acknowledgment message is used to notify the NEF network element that the AF network element has acknowledged receiving of the signaling plane data.

It should be noted that step 201 is an optional step, to be specific, is not mandatory.

In addition, it should be noted that step 207 to step 210 may be performed for a plurality of times. For example, the monitoring event configured in the monitoring request message is monitoring the signaling plane data exchanged between the terminal device and the AMF network element within monitoring duration, and if the terminal device continuously sends three pieces of signaling plane data to the AMF network element within the monitoring duration, step 207 to step 210 need to be performed three times. A quantity of times of performing step 207 to step 210 is not limited in this embodiment of this application. In FIG. 2, an example in which step 207 to step 210 are performed twice is used.

Step 211: The AF network element determines, based on the signaling plane data, that the terminal device is a device that initiates a DoS attack.

In this embodiment of this application, an example in which the AF network element determines, based on an amount of the signaling plane data and/or a length of the signaling plane data, whether the terminal device is a device that initiates a DoS attack is used.

A specific implementation of step 211 includes but is not limited to the following four determining manners. The following separately describes the four determining manners.

In a first determining manner, whether the terminal device is a device that initiates a DoS attack is determined based on the amount of the signaling plane data. A specific implementation is as follows.

In a first example, if the monitoring request message indicates monitoring signaling plane data of a terminal device within monitoring duration, such as one hour, the AF network element may superpose the received signaling plane data of the terminal device and perform determining. For example, after receiving the first piece of signaling plane data of the terminal device, the AF network element determines an amount of the first piece of signaling plane data. For example, if the signaling plane data is a data packet, the AF network element determines a size of the data packet of the piece of first signaling plane data. If the size is less than a threshold, such as 10 M or 20 M, preset by the AF network element, the AF network element determines a size of a data packet of the second piece of received signaling plane data, and determines whether a sum of the size of the data packet of the first piece of signaling plane data and the size of the data packet of the second piece of signaling plane data is greater than or equal to the threshold. If the sum of the sizes of the data packets is greater than or equal to the threshold, the AF network element determines that the terminal device is a device that initiates a DoS attack; or if the AF network element determines that a sum of sizes of data packets of all the signaling plane data of the terminal device within the monitoring duration is less than the threshold, the AF network element determines that the terminal device is not a device that initiates a DoS attack.

If the monitoring request message indicates monitoring the signaling plane data of all the terminal devices that interact with the AMF network element within the monitoring duration, after receiving the signaling plane data sent by the NEF network element, the AF network element first needs to classify, based on an identifier of a terminal device corresponding to each piece of signaling plane data, the received signaling plane data based on different terminal devices, and then performs the foregoing determining process on an amount of the signaling plane data of each terminal device, to determine whether a device that initiates a DoS attack exists in all the terminal devices that interact with the AMF network element.

In a second example, if the monitoring request message indicates monitoring signaling plane data of all terminal devices that interact with the AMF network element within the monitoring duration, after receiving the signaling plane data sent by the NEF network element, the AF network element classifies signaling plane data sent by each terminal device. For example, based on different purposes of the signaling plane data, signaling plane data used to transmit video data is classified into one type, signaling plane data used to transmit voice data is classified into one type, and signaling plane data used to transmit text data is classified into one type. Then, the AF network element counts an amount of the signaling plane data of each type, for example, collects statistics about a size of a data packet of each type of signaling plane data. If at a current moment, the size of the data packet of a specific type of signaling plane data is less than a threshold, such as 10 M or 20 M, preset by the AF network element, after adding new signaling plane data to the type, the AF network element re-determines a size of a data packet of this type of signaling plane data. If a sum of sizes of data packets of this type of signaling plane data is greater than or equal to the threshold, the AF network element determines that this type of signaling plane data is data used to implement a DoS attack, and determines that a terminal device that sends this type of signaling plane data is a device that initiates the DoS attack. For example, the AF network element determines that a sum of sizes of data packets of the signaling plane data used to transmit video data is greater than the threshold, and identifiers of corresponding terminal devices in this type of signaling plane data are a terminal device 1, a terminal device 3, and a terminal device 4. The AF network element determines that the terminal device 1, the terminal device 3, and the terminal device 4 are devices that initiate a DoS attack. If the AF network element determines that a sum of sizes of data packets of all the types of signaling plane data of the terminal device within the monitoring duration is less than the threshold, the AF network element determines that a device that initiates a DoS attack does not exist in the terminal devices that interact with the AMF network element.

For a DoS attack based on a protocol vulnerability, an amount of signaling plane data sent, within a unit time, by a terminal device that initiates a DoS attack may not exceed the threshold. The terminal device that initiates a DoS attack repeatedly sends repeated offensive service requests or malformed attack data by using the protocol vulnerability, causing overflow of a system buffer of the AMF network element, and further leading to a system crash. For example, a ping of death is performed, or ARP spoofing attacks are continuously performed at specific frequency by using a series of incorrect internal MAC addresses. Consequently, a real address cannot be stored in a router through updating. As a result, all data in the router can be sent only to the incorrect MAC addresses, and no information can be received by a normal terminal device or network element in the communications system. However, signaling plane data sent for a DoS attack that is based on a protocol vulnerability has a specific characteristic. For example, a length of a single packet of the ping of death exceeds a packet length specified in the IP protocol specification, or an internal MAC address under an ARP spoofing attack is incorrect. Therefore, whether the terminal device is a device that initiates a DoS attack may be determined by using the characteristic of the signaling plane data for the attack that is based on the protocol vulnerability. In this embodiment of this application, an example in which the characteristic of the signaling plane data sent for the DoS attack that is based on the protocol vulnerability is that the length of the single packet exceeds the packet length specified in the IP protocol specification is used for description.

In view of this, a second determining manner in this embodiment of this application is that whether the terminal device is a device that initiates a DoS attack is determined based on the length of the signaling plane data. A specific implementation is as follows.

If the monitoring request message indicates monitoring signaling plane data of a terminal device within monitoring duration, such as one hour, the AF network element needs to determine received signaling plane data of each terminal device. For example, after receiving the first piece of signaling plane data of the terminal device, the AF network element determines a length of the first piece of signaling plane data. For example, if the signaling plane data is a data packet, the AF network element determines a packet length of the data packet of the first piece of signaling plane data. If the packet length is less than a length preset by the AF network element, and for example, the preset length may be a length corresponding to a maximum transmission unit for signaling plane data that is allowed to be transmitted in a data link layer protocol applied by the terminal device, or may be another length, the AF network element determines whether a packet length of a data packet of the second piece of received signaling plane data is greater than or equal to the preset length. The rest can be deduced by analogy. If the AF network element determines that a packet length of a data packet of the fourth piece of signaling plane data of the terminal device is greater than the preset length, the AF network element determines that the terminal device is a device that initiates a DoS attack. If the AF network element determines that packet lengths of data packets of all the signaling plane data of the terminal device within the monitoring duration are less than the preset length, the AF network element determines that the terminal device is not a device that initiates a DoS attack.

If the monitoring request message indicates monitoring signaling plane data of all terminal devices that interact with the AMF network element within monitoring duration, after receiving the signaling plane data sent by the NEF network element, the AF network element first needs to classify, based on an identifier of a terminal device corresponding to each piece of signaling plane data, the received signaling plane data based on different terminal devices, and then performs the foregoing determining process on a length of signaling plane data of each terminal device, to determine whether a device that initiates a DoS attack exists in all the terminal devices that interact with the AMF network element.

In this way, when the AF network element determines that the DoS attack is an attack based on a protocol vulnerability, the AF network element may process the DoS attack in time, so that the DoS attack can be processed in time without fixing the protocol vulnerability. Further, a quantity of times that the core network element fixes the protocol vulnerability can also be reduced, thereby reducing load of the core network element.

In a third determining manner, whether the terminal device is a device that initiates a DoS attack is determined based on the amount of the signaling plane data and the length of the signaling plane data. To be specific, when the monitoring request message indicates monitoring signaling plane data of a terminal device within monitoring duration, the AF network element needs to separately determine an amount and a length of each piece of signaling plane data of the terminal device. If the amount of the signaling plane data of the terminal device within the monitoring duration is less than a threshold, and the length of each piece of signaling plane data of the terminal device within the monitoring duration is less than a preset length, it is determined that the terminal device is not a device that initiates a DoS attack. It should be noted that, a method for determining the amount of each piece of signaling plane data is the same as the method in the first determining manner, and a method for determining the length of each piece of signaling plane data is the same as the method in the second determining manner. Details are not described herein again.

To improve accuracy of determining a DoS device by the AF network element, this embodiment of this application provides a fourth determining manner. A specific implementation is as follows.

When sending the signaling plane data of the terminal device to the NEF network element in step 208, the AMF network element may further add location information of the terminal device to the data. In this way, the AF network element may obtain the signaling plane data of the terminal device and the location information of the terminal device in step 209, and the AF network element may determine, based on the signaling plane data of the terminal device and the location information of the terminal device, whether the terminal device is a device that initiates a DoS attack.

Specifically, the AF network element may determine, in one of the first determining manner to the third determining manner, whether the amount of the signaling plane data and/or the length of the signaling plane data satisfy a condition for initiating a DoS attack, for example, whether the amount of the signaling plane data is greater than or equal to the threshold, and/or whether the length of the signaling plane data is greater than or equal to the preset length. Further, the AF network element needs to determine, based on the location information of the terminal device, whether the terminal device is located at a location at which the terminal device is easily controlled by a third party. For example, the location may be in a desert environment, a residential area, a business area, or the like. The AF network element may prestore a correspondence between a location and a degree of difficulty of being controlled by a third party. For example, the correspondence may be as follows: If the location information of the terminal device indicates that the terminal device is located in a desert environment, the AF network element considers that the terminal device is not easily controlled by a third party; if the location information of the terminal device indicates that the terminal device is located in a business area, the AF network element considers that the terminal device is easily controlled by a third party. Certainly, another correspondence may alternatively be set in the AF network element. Examples are not listed one by one herein.

When the AF network element determines whether the amount and/or the length of the signaling plane data of the terminal device satisfy the condition for initiating a DoS attack, and the AF network element determines, based on the location information of the terminal device and the preset correspondence between a location and a degree of difficulty of being controlled by a third party, that the terminal device is located at a location at which the terminal device is easily controlled by a third party, the AF network element determines that the terminal device is a device that initiates a DoS attack. When the AF network element determines whether the amount and/or the length of the signaling plane data of the terminal device satisfy the condition for initiating a DoS attack, but the terminal device is located at a location at which the terminal device is not easily controlled by a third party, the AF network element determines that the terminal device is not a device that initiates a DoS attack.

In this way, the AF network element may determine, with reference to other information of the terminal device, whether the terminal device is a device that initiates a DoS attack, so that accuracy of a determining result can be improved, and misjudgment can be prevented.

It should be noted that when the AF network element needs to determine, with reference to other information of the terminal device, whether the terminal device is a device that initiates a DoS attack, the AF network element may alternatively obtain the other information by sending a request message to the AMF network element. For example, the acknowledgment message in step 210 may carry a request for obtaining the other information. For example, the acknowledgment message carries request information used to obtain the location information of the terminal device, and then the NEF network element sends the acknowledgment message to the AMF network element. In this case, before step 211, the AF network element obtains the location information of the terminal device that is sent by the AMF network element, or may use the acknowledgment message in step 210 as a request message for obtaining the other information, where the request message may be used to indicate that the AF network element receives the signaling plane data of the terminal device that is sent by the AMF network element. Alternatively, after step 210, the AF network element sends, to the NEF network element, a request message used to obtain the other information, and then the NEF network element forwards the request message to the AMF network element. After receiving the request message, the AMF network element feeds back the other information to the AF network element. A manner in which the AF network element obtains the other information is not limited in this embodiment of this application.

Certainly, the AF network element may alternatively determine, with reference to the signaling plane data of the terminal device, whether the terminal device is a device that initiates a DoS attack. Details are not described herein again.

Step 212: The AF network element sends first indication information to the NEF network element, and the NEF network element receives the first indication information.

In this embodiment of this application, the first indication information is used to instruct the AMF network element to initiate a deregistration procedure for the terminal device.

After determining that the terminal device is a device that initiates a DoS attack, the AF network element sends, to the NEF network element, the indication information for deregistering the terminal device. It should be noted that the first indication information may alternatively be used to indicate an operation that can block a DoS attack, such as stopping receiving the signaling plane data sent by the terminal device or stopping providing a network service for the terminal device. This is not limited in this embodiment of this application.

In this way, when the AF network element can prevent, in time by using the first indication information, the terminal device from initiating a DoS attack, another terminal device can normally access a network.

It should be noted that step 211 and step 212 may be combined into one step. To be specific, when the AF network element determines, in the four determining manners in step 211, that the terminal device satisfies the condition for initiating a DoS attack, the AF network element performs step 212. In this case, the determining that the terminal device is a device that initiates a DoS attack in step 211 may be understood as a specific action. For example, determining that the terminal device is a device that initiates a DoS attack is step 212. In FIG. 2, an example in which step 211 and step 212 are two different steps is used.

Step 213: The NEF network element sends the first indication information to the AMF network element, and the AMF network element receives the first indication information.

Step 214: The AMF network element sends a deregistration message to the terminal device according to the first indication information, and the terminal device receives the deregistration message.

In this embodiment of this application, the deregistration message is a deregistration request message, the deregistration request message sent by the AMF network element to the terminal device may include a deregistration type, and the deregistration type may include re-registration. In this way, after the terminal device recovers, the terminal device may initiate a registration procedure again.

Step 215: The AMF network element sends a feedback message to the AF network element, and the AF network element receives the feedback message.

After sending the deregistration message to the terminal device, the AMF network element may send the feedback message to the AF network element, to confirm that a deregistration operation is performed on the terminal device. For example, the feedback message may be:

a Nudm_UEContextManagement_RemoveNotification Response message.

Step 216: The AMF network element initiates deletion of a PDU session established for the terminal device and a QoS policy for the terminal device.

Step 217: The AMF network element releases an RRC connection to the terminal device.

Specifically, after receiving the deregistration request message, the terminal device sends a deregistration accept message to the AMF network element, and then the AMF network element and the RAN release the RRC connection to the terminal device, to complete a deregistration procedure of the terminal device.

Step 218: The AF network element processes information about the terminal device.

After obtaining the information about the terminal device, the AF network element may generate prompt information, to prompt an administrator to perform an operation, such as checking and repairing, on the terminal device. If the AF network element determines that a plurality of terminal devices initiate a DoS attack, the AF network element may further perform analysis based on location information of the plurality of terminal devices, to determine a region and the like about the DoS attack to be initiated, so that the terminal device in the region can defend the attack in advance. Certainly, the AF network element may alternatively perform another processing process. Examples are not listed one by one herein again.

It should be noted that, in this embodiment of this application, an execution sequence of step 218 and step 212 to step 217 is not limited, to be specific, step 218 may be performed before step 212 to step 217; or step 212 to step 217 may be performed before step 218; or step 212 to step 217 and step 218 may be simultaneously performed.

It should be noted that step 212 to step 218 are all optional steps, to be specific, are not mandatory.

In the foregoing technical solution, the AF network element has a capability of obtaining signaling plane data of a terminal device that interacts with the AMF network element, so that after obtaining the signaling plane data, the AF network element can determine, by analyzing the signaling plane data, a device that may initiate a DoS attack, to prevent occurrence of the DoS attack, thereby improving security performance of an mMTC application scenario.

In the embodiment shown in FIG. 2, a process in which the AF network element prevents a DoS attack by using signaling plane data of a terminal device is described. A resource needs to be occupied when the core network element sends the signaling plane data of the terminal device to the AF network element. To save the resource and simplify calculation complexity of the AF network element, in another manner, the core network element may alternatively be used to prevent a DoS attack.

Figure 3:
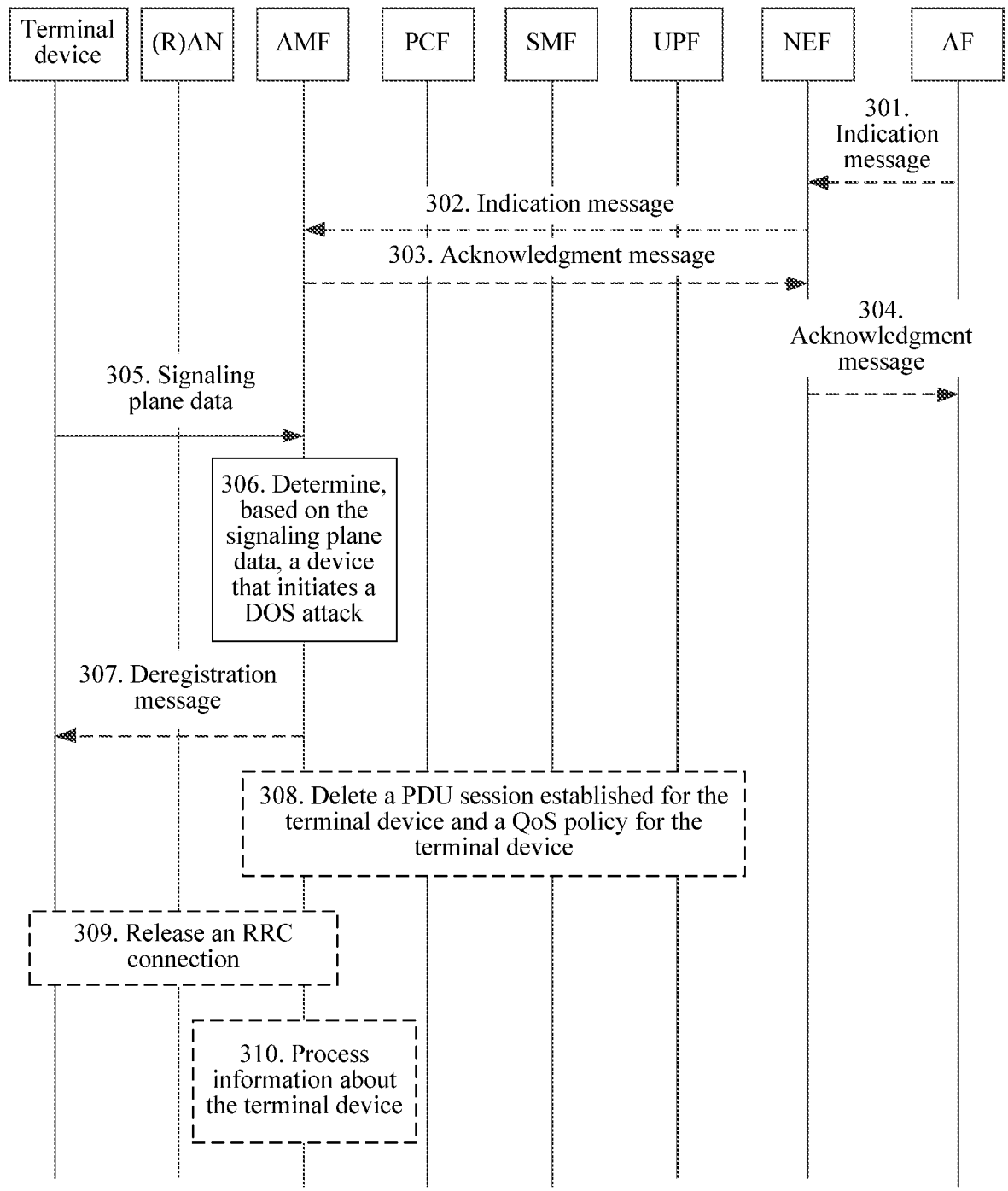
FIG. 3 is a flowchart of another example of a device monitoring and deregistration method according to an embodiment of this application.

FIG. 3 is a flowchart of another example of a device monitoring and deregistration method according to an embodiment of this application. For example, the example is applied to the communications system shown in FIG. 1. The flowchart is described as follows.

Step 301: The AF network element sends an indication message to the NEF network element, and the NEF network element receives the indication message.

In this embodiment of this application, the indication message is used to instruct the AMF network element to monitor signaling plane data of a terminal device. The indication message may be used to instruct the AMF network element to monitor attribute information such as an amount, a type, and a packet length of the signaling plane data exchanged with the terminal device; or may be used to instruct the AMF network element to monitor frequency of exchanging the signaling plane data with the terminal device; or certainly may be used to instruct the AMF network element to monitor, another parameter of the signaling plane data exchanged between the terminal device and the AMF network element. This is not limited herein. In the following descriptions, an example in which the indication information is used to instruct the AMF network element to monitor attribute information of signaling plane data exchanged between a terminal device and a core network element is used.

It should be noted that a parameter included in the indication information is the same as a parameter included in the monitoring request message in step 201. Details are not described herein again.

Step 302: The NEF network element sends the indication message to the AMF network element, and the AMF network element receives the indication message.

Step 303: The AMF network element sends an acknowledgment message to the NEF network element, and the NEF network element receives the acknowledgment message.

The acknowledgment message is used to instruct the AMF network element to receive the indication message.

Step 304: The NEF network element sends the acknowledgment message to the AF network element, and the AF network element receives the acknowledgment message.

It should be noted that step 301 to step 304 are optional steps, to be specific, are not mandatory. In addition, the indication information in step 301 may alternatively be the monitoring request message in step 201. If the indication information in step 301 is the monitoring request message in step 201, step 301 to step 304 may be replaced with step 201 to step 206. Details are not described herein again.

Step 305: The terminal device sends data to the AMF network element by using a signaling plane, and the AMF network element receives the signaling plane data.

Step 305 is the same as step 207. Details are not described herein again.

Step 306: The AMF network element determines, based on the signaling plane data, that the terminal device is a device that initiates a DoS attack.

Step 306 is the same as step 211. Details are not described herein again.

Step 307: The AMF network element sends a deregistration message to the terminal device, and the terminal device receives the deregistration message.

When the AMF network element determines that the terminal device is a device that initiates a DoS attack, the AMF network element initiates a deregistration procedure for the terminal device. A specific implementation is the same as that in step 214. Details are not described herein again.

It should be noted that step 306 and step 307 may be combined into one step. To be specific, if the AMF network element determines, based on step 306, that the terminal device satisfies a condition for initiating a DoS attack, the AMF network element performs step 307. In this case, the determining that the terminal device is a device that initiates a DoS attack in step 306 may be understood as a specific action. For example, determining that the terminal device is a device that initiates a DoS attack is step 307. In FIG. 3, an example in which step 306 and step 307 are two different steps is used.

Step 308: The AMF network element initiates deletion of a PDU session established for the terminal device and a QoS policy for the terminal device.

Step 309: The AMF network element releases an RRC connection to the terminal device.

Step 307 is the same as step 214, and step 308 and step 309 are the same as step 216 and step 217. Details are not described herein again.

Step 310: The AMF network element processes information about the terminal device.

After the AMF network element determines that the terminal device is a device that initiates a DoS attack, the AMF network element may further obtain the information related to the terminal device, for example, an identifier of the terminal device and the signaling plane data sent by the terminal device. In this way, the AMF network element may analyze, based on the information about the terminal device, an area and the like about the DoS attack to be initiated, so that the terminal device in the area can defend the DoS attack in advance, and the like.

Certainly, after the AMF network element determines that the terminal device is a device that initiates a DoS attack, the AMF network element may further send the information related to the terminal device to the AF network element, so that the AF network element analyzes, based on the information related to the terminal device, the area and the like about the DoS attack to be initiated, so that operation complexity of the AMF network element can be simplified. Alternatively, the AMF network element may send, to the AF network element, a processing result obtained after the information related to the terminal device is processed, so that signaling overheads between the AMF network element and the AF network element can be reduced.

It should be noted that step 307 to step 310 are all optional steps, to be specific, are not mandatory. In addition, an execution sequence of step 307 to step 310 is not limited in this embodiment of this application. To be specific, step 310 may be performed before step 307 to step 309, or step 307 to step 310 may be performed in sequence, or step 307 to step 310 may be simultaneously performed.

According to the foregoing technical solution, the AMF network element has a capability of analyzing signaling plane data of a terminal device, so that after obtaining the signaling plane data, the AMF network element can determine, by analyzing the signaling plane data, a device that may initiate a DoS attack, to prevent occurrence of the DoS attack, thereby improving security performance of an mMTC application scenario.

In the embodiments shown in FIG. 2 and FIG. 3, a process of preventing a DoS attack by using the AF network element or the AMF network element is described. In another manner, the AF network element and the AMF network element may be used together to prevent a DoS attack.

Figure 4A:
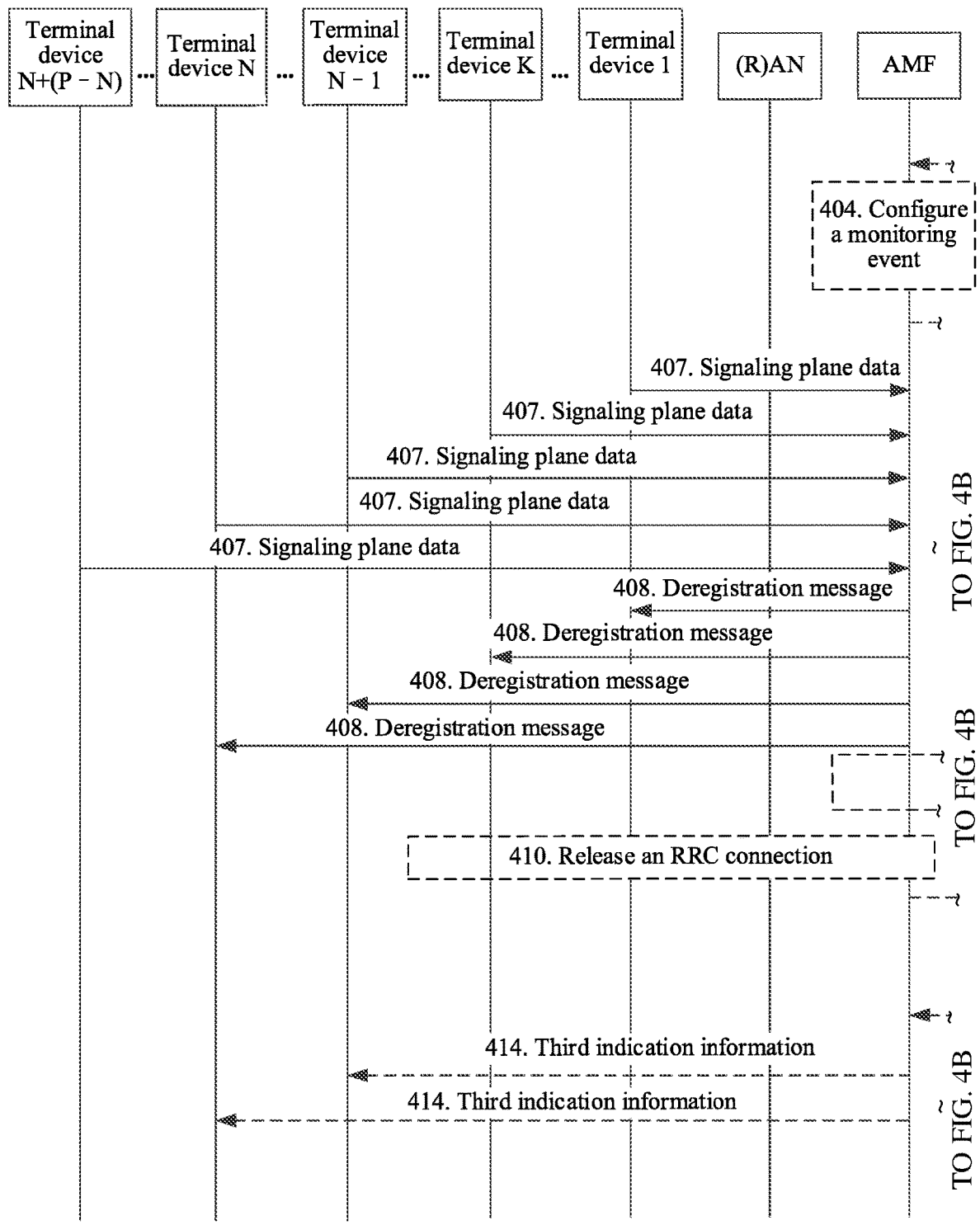
FIG. 4A and FIG. 4B are a flowchart of another example of a device monitoring and deregistration method according to an embodiment of this application.
Figure 4B:
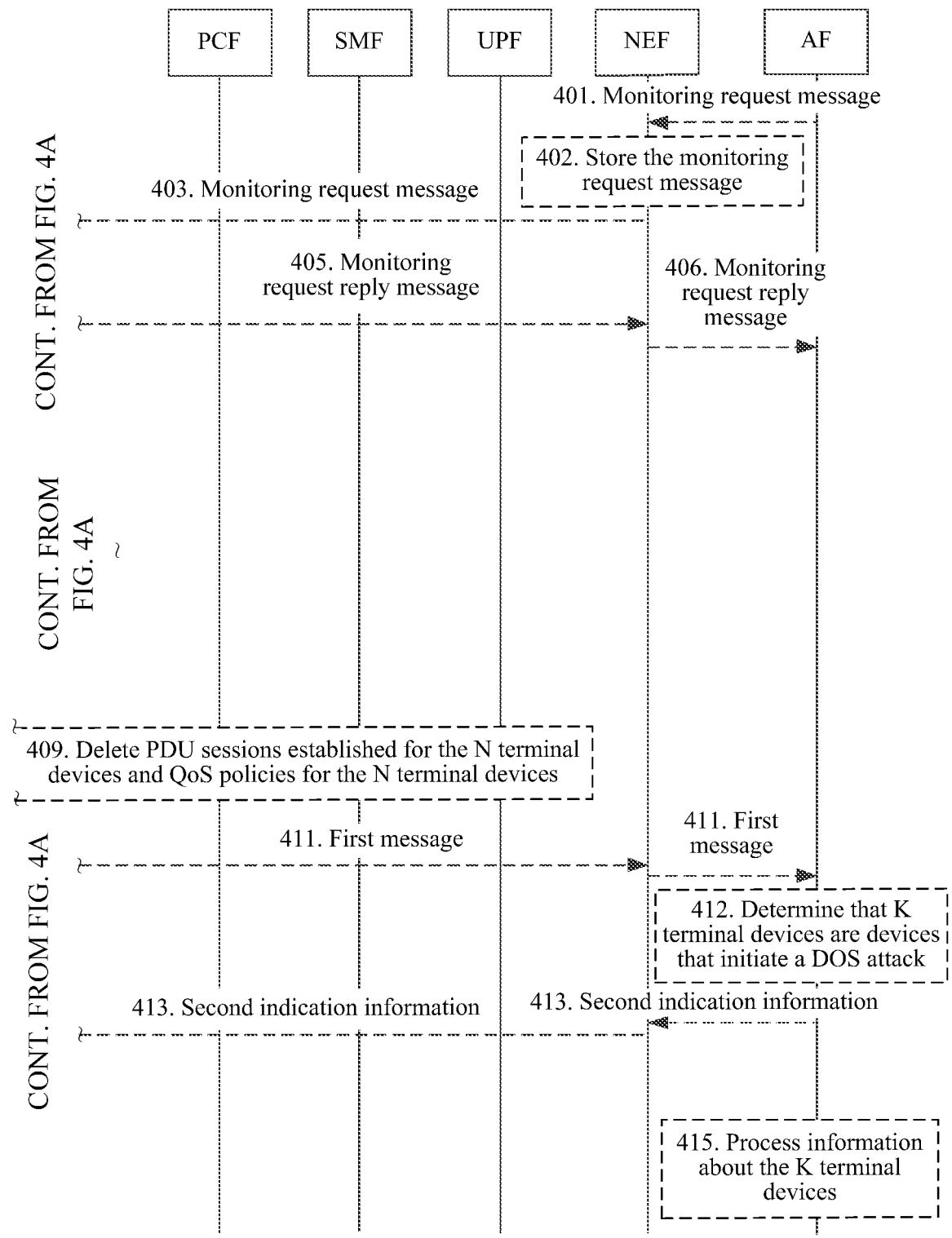

FIG. 4A and FIG. 4B are a flowchart of another example of a device monitoring and deregistration method according to an embodiment of this application. For example, the example is applied to the communications system shown in FIG. 1. The flowchart is described as follows.

Step 401: The AF network element sends a monitoring request message to the NEF network element, and the NEF network element receives the monitoring request message.

In this embodiment of this application, the monitoring request message is used to configure a monitoring event of a core network element for a terminal device, and the monitoring event is used to monitor a processing result of the core network element for the terminal device. For example, the processing result is that the core network element has deregistered the terminal device, or that the core network element stops receiving signaling plane data sent by the terminal device. Certainly, the processing result may be other processing performed by the core network element on the terminal device. This is not limited herein. In the following descriptions, an example in which the monitoring event is used to monitor a processing result of whether the core network element has deregistered the terminal device is used.

It should be noted that the core network element in this embodiment of this application is the same as that in step 201. Details are not described herein again. In the following descriptions, an example in which the AMF network element is one of AMF network elements that interact with the AF network element is used.

The monitoring request message is described below.

In this embodiment of this application, the monitoring request message may include the following parameters:

(1) monitoring duration;

(2) monitoring period;

(3) monitored object, where parameters (1) to (3) are the same as corresponding content in step 201, and details are not described herein again;

(4) monitoring parameter, where the monitoring parameter is signaling plane data exchanged between the terminal device and the core network element; in this embodiment of this application, the monitoring parameter is attribute information of the signaling plane data exchanged between the terminal device and the core network element; for example, the monitoring parameter may be an amount, a type, a packet length, or the like of the signaling plane data exchanged between the terminal device and the core network element, or certainly may be other attribute information; this is not limited herein; in the following descriptions, an example in which the monitoring parameter is the amount, the type, and the packet length of the signaling plane data exchanged between the terminal device and the core network element is used;

(5) processing manner if the monitoring parameter satisfies a preset condition, where for example, the processing manner if the monitoring parameter satisfies the preset condition may be deregistering a terminal device whose amount of signaling plane data exchanged with the core network element exceeds a threshold within a unit time, where the unit time may be 1 minute, 10 seconds, or the like; the processing manner if the monitoring parameter satisfies the preset condition may alternatively be deregistering a terminal device that sends a specific type of signaling plane data, and the specific type is preset by the AF network element; for example, the specific type may be signaling plane data used to request video data, or the like; or the specific type may be obtained by the core network element through statistics collection based on the amount of the exchanged signaling plane data, and an amount of the specific type of signaling plane data received within a unit time is greater than or equal to a threshold; for example, if the core network element determines, in all terminal devices that interact with the core network element, an amount of signaling plane data used to request voice data exceeds the threshold within a unit time, the core network element determines that the specific type is the signaling plane data used to request voice data; certainly, the processing manner if the monitoring parameter satisfies the preset condition satisfy may alternatively be another case, which is not limited herein; and (6) monitoring type, where the monitoring type is a processing result of whether the core network element has deregistered the terminal device.

It should be noted that in this embodiment of this application, the parameter in the monitoring request message includes at least the monitoring type, and the AF network element may set the parameter in the monitoring request message based on an actual situation. This is not limited herein.

In addition, it should be noted that an occasion on which the AF network element sends the monitoring request message is the same as that in step 201. This is not limited herein.

Step 402: The NEF network element stores the monitoring request message.

Step 403: The NEF network element sends the monitoring request message to the AMF network element, and the AMF network element receives the monitoring request message.

Step 404: The AMF network element configures the monitoring event.

After the AMF network element configures the monitoring event, the AMF network element may deregister a terminal device that satisfies the condition. For example, the AMF network element deregisters a terminal device whose amount of signaling plane data exchanged with the core network element exceeds a threshold within a unit time, or deregisters a terminal device that sends a specific type of signaling plane data. In this way, a DoS attack initiated by the terminal device can be prevented in time, so that a network of the communications system is not congested, thereby ensuring normal access of another terminal device to the network.

Step 405: The AMF network element sends a monitoring reply message to the NEF network element, and the NEF network element receives the monitoring reply message.

Step 406: The NEF network element sends the monitoring reply message to the AF network element, and the AF network element receives the monitoring reply message.

It should be noted that step 401 to step 406 are optional steps, to be specific, are not mandatory.

Step 407: The terminal device sends data to the AMF network element by using a signaling plane, and the AMF network element receives the signaling plane data.

Step 402 to step 407 are the same as step 202 to step 207. Details are not described herein again. In addition, it should be noted that step 407 may be performed for a plurality of times. For example, the monitoring event configured in the monitoring request message is monitoring a processing result of the AMF network element for the terminal device within monitoring duration, and if the terminal device continuously sends three pieces of signaling plane data to the AMF network element within the monitoring duration, step 407 needs to be performed three times. A quantity of times of performing step 407 is not limited in this embodiment of this application. In FIG. 4A and FIG. 4B, an example in which step 407 is performed twice is used.

Step 408: The AMF network element sends a deregistration message to the terminal device based on the signaling plane data sent by the terminal device, and the terminal device receives the deregistration message.

It should be noted that if step 401 to step 406 are performed before step 408, after receiving the signaling plane data sent by the terminal device, the AMF network element deregisters, based on the configured monitoring event, the terminal device that satisfies the condition. If step 401 to step 406 are not performed before step 408, a manner of processing a terminal device that sends signaling plane data may be preset in the AMF network element. The processing manner may be deregistering a terminal device whose amount of signaling plane data exchanged between the terminal device and the core network element exceeds a threshold within a unit time, or deregistering a terminal device that sends a specific type of signaling plane data, or certainly may be another processing manner. Therefore, after receiving the signaling plane data, the AMF network element processes, in the preset processing manner, the terminal device that sends the signaling plane data.

The following describes a process in which the AMF network element deregisters the terminal device. In this embodiment of this application, cases in which the AF network element configures a monitoring event for the AMF network element, and the monitoring event is one of the following five cases are separately described below.

In a first case, when the monitoring event is deregistering a terminal device whose amount of signaling plane data exchanged with the core network element within a unit time exceeds a threshold, the AMF network element determines, based on the first example of the first determining manner in step 211, determining whether the amount of the signaling plane data sent by the terminal device exceeds the threshold, and the threshold may be preset by the AF network element. For example, the threshold may be 10 M or 20 M. In this case, the AMF network element sends the deregistration message to the terminal device.

It should be noted that if the monitored object of the monitoring event is a terminal device, the AMF network element needs to perform only the foregoing processing on signaling plane data of the terminal device. If the monitored object of the monitoring event is all terminal devices that interact with the AMF network element, the AMF network element needs to determine whether signaling plane data sent by each terminal device exceeds the threshold. For example, if the AMF network element determines that signaling plane data sent by N terminal devices exceeds the threshold, the AMF network element needs to send the deregistration message to each of the N terminal devices. Details are not described herein again.

In a second case, when the monitoring event is deregistering a terminal device that sends a specific type of signaling plane data, and the specific type is set by the AF network element, after receiving the signaling plane data sent by the terminal device, the AMF network element determines whether a type of the signaling plane data is the specific type, and if the type of the signaling plane data is the specific type, the AMF network element sends the deregistration message to the terminal device. Details are not described herein again.

In a third case, when the monitoring event is deregistering a terminal device that sends a specific type of signaling plane data, and the specific type is determined by the AMF network element based on a type of the actually received signaling plane data, the AMF network element determines, by using the second example in the first determining manner in step 211, that types of signaling plane data sent by N terminal devices in a plurality of terminal devices that interact with the AMF network element are the specific type, so that the AMF network element sends the deregistration message to the N terminal devices. Details are not described herein again. It should be noted that, in this case, the monitored object of the monitoring event is all the terminal devices that interact with the AMF network element.

In a fourth case, when the monitoring event is deregistering a terminal device whose length of sent signaling plane data is greater than a preset length, the AMF network element determines, by using the second determining manner in step 211, that lengths of pieces of signaling plane data sent by N terminal devices in a plurality of terminal devices that interact with the AMF network element are greater than the preset length, where the preset length may be a length corresponding to a maximum transmission unit for signaling plane data that is allowed to be transmitted in a data link layer protocol applied by the terminal device, or may be another length, so that the deregistration message is sent to the N terminal devices. Details are not described herein again.

In a fifth case, when the monitoring event is deregistering a terminal device whose amount of signaling plane data exchanged with the core network element within a unit time exceeds a threshold and length of the sent signaling plane data is greater than a preset length, the AMF network element determines, by using the third determining manner in step 211, to send the deregistration message to N terminal devices in a plurality of terminal devices that interact with the AMF network element. Details are not described herein again.

For ease of description, in the following descriptions, in this embodiment of this application, an example in which there are P terminal devices that interact with the AMF network element, and the AMF network element sends the deregistration message to N terminal devices is used. It should be noted that in this embodiment of this application, the deregistration message is the same as the deregistration message in step 214. Details are not described herein again.

Step 409: The AMF network element initiates deletion of a PDU session established for the terminal device and a QoS policy for the terminal device.

Step 410: The AMF network element releases an RRC connection to the terminal device.

Step 409 and step 410 are the same as step 216 and step 217. Details are not described herein again.

Step 411: The AMF network element sends a first message to the AF network element, and the AF network element receives the first message.

In this embodiment of this application, the first message is used to indicate that the N terminal devices have been deregistered. To be specific, the AMF network element sends a processing result for the terminal device to the AF network element.

Step 412: The AF network element determines that K terminal devices in the N terminal devices are devices that initiate a DoS attack.

Specifically, after receiving the first message, the AF network element obtains location information of the N terminal devices. A manner of obtaining the location information of each of the N terminal devices may be the same as the manner of obtaining the location information of the terminal device in the fourth determining manner in step 211. Details are not described herein again. After obtaining the location information of the N terminal devices, the AF network element determines whether each of the N terminal devices is located at a location at which a probability that the terminal device is attacked by a third party is greater than a preset probability. A specific determining manner is the same as corresponding content in the fourth determining manner in step 211, and details are not described herein again. Therefore, it is determined that the K terminal devices in the N terminal devices are located at the location at which the probability that the terminal device is attacked by a third party is greater than the preset probability, to be specific, the K terminal devices are devices that initiate a DoS attacks.

In this way, the AF network element may comprehensively analyze, with reference to other information of the terminal device, for example, the location information, whether the terminal device is a device that initiates a DoS attack, so that accuracy of the foregoing determining process can be improved.

Step 413: The AF network element sends second indication information to the AMF network element, and the AMF network element receives the second indication information.

In this embodiment of this application, the second indication information is used to instruct the AMF network element to initiate a registration procedure for N-K terminal devices. When determining, based on the location information of the terminal device, that the N-K terminal devices are not devices that initiate a DoS attack, the AF network element sends the second indication information to the AMF network element, so that the N-K terminal devices resume communication with the AMF network element.

Step 414: The AMF network element sends third indication information to the N-K terminal devices, and the N-K terminal devices receive the third indication information.

In this embodiment of this application, the third indication information is used to instruct the N-K terminal devices to be re-registered. A specific registration process is the same as that in the prior art, and details are not described herein again.

Step 415: The AF network element processes information about the K terminal devices.

Step 415 is the same as step 218. Details are not described herein again.

It should be noted that step 409 to step 415 are all optional steps, to be specific, are not mandatory.

According to the foregoing technical solution, the core network element may directly deregister a terminal device that may initiate a DoS attack, to prevent occurrence of the DoS attack in time, send the processing result to an application function network element, and perform, by using the application function network element, more comprehensive analysis on the terminal device that may initiate a DoS attack. Therefore, determining accuracy can be improved, and security performance of an mMTC application scenario can be further improved.

In the foregoing embodiments provided in this application, the methods provided in the embodiments of this application are separately described from perspectives of the application server, the core network element, and interaction between the application server and the core network element. To implement the functions in the methods provided in the embodiments of this application, the application server and the core network element may include a hardware structure and/or a software module, to implement the functions in a form of a hardware structure, a software module, or a combination of a hardware structure and a software module. Whether a function of the foregoing functions is performed by using a hardware structure, a software module, or a combination of a hardware structure and a software module depends on a specific application and a design constraint condition of the technical solution.

Figure 5A:
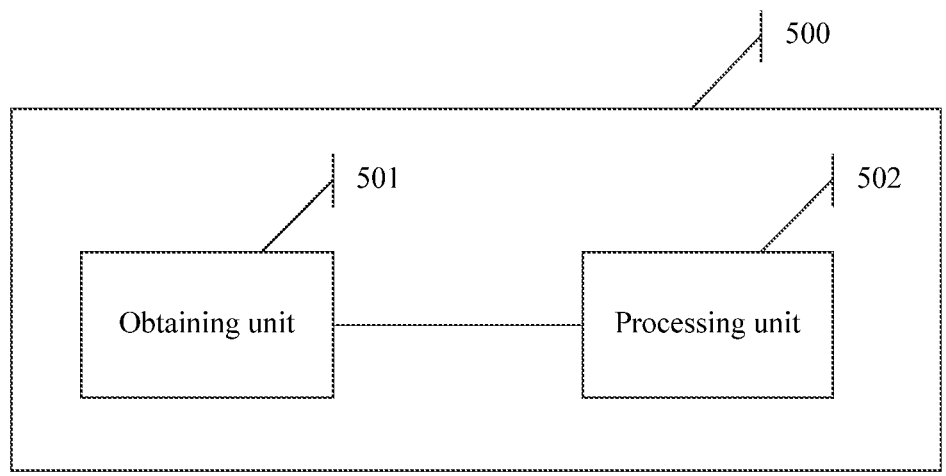
FIG. 5A and FIG. 5B each are a schematic structural diagram of a device monitoring apparatus according to an embodiment of this application.
Figure 5B:
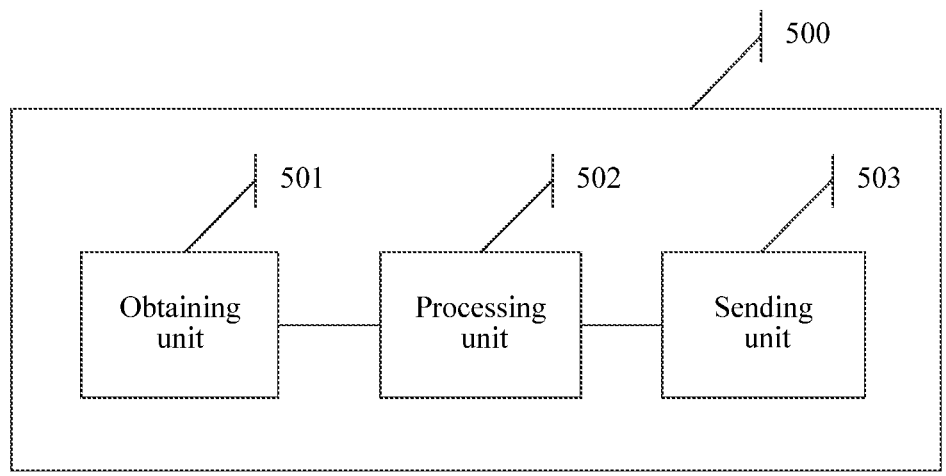

FIG. 5A and FIG. 5B each are a schematic structural diagram of a device monitoring apparatus 500. The device monitoring apparatus 500 may be an application server, and can implement a function of the application server in the method provided in the embodiments of this application. Alternatively, the device monitoring apparatus 500 may be an apparatus that can support an application server in implementing a function of the application server in the method provided in the embodiments of this application. The device monitoring apparatus 500 may be a hardware structure, a software module, or a combination of a hardware structure and a software module. The device monitoring apparatus 500 may be implemented by using a chip system. In this embodiment of this application, the chip system may include a chip, or may include a chip and another discrete component.

The device monitoring apparatus 500 may include an obtaining unit 501 and a processing unit 502.

The obtaining unit 501 may be configured to perform step 209 in the embodiment shown in FIG. 2, and/or configured to support another process of the technology described in this specification. The obtaining unit 501 is used by the device monitoring apparatus 500 to communicate with another module, and may be a circuit, a component, an interface, a bus, a software module, a transceiver, or any other apparatus that can implement communication.

The processing unit 502 may be configured to perform step 211 or step 218 in the embodiment shown in FIG. 2, and/or configured to support another process of the technology described in this specification.

In a possible implementation, as shown in FIG. 5B, the device monitoring apparatus 500 further includes a sending unit 503. The sending unit 503 may be configured to perform step 212 in the embodiment shown in FIG. 2, and/or configured to support another process of the technology described in this specification. The sending unit 503 is used by the device monitoring apparatus 500 to communicate with another module, and may be a circuit, a component, an interface, a bus, a software module, a transceiver, or any other apparatus that can implement communication.

All related content of the steps in the foregoing method embodiment may be cited in function descriptions of the corresponding functional modules. Details are not described herein again.

Figure 6A:
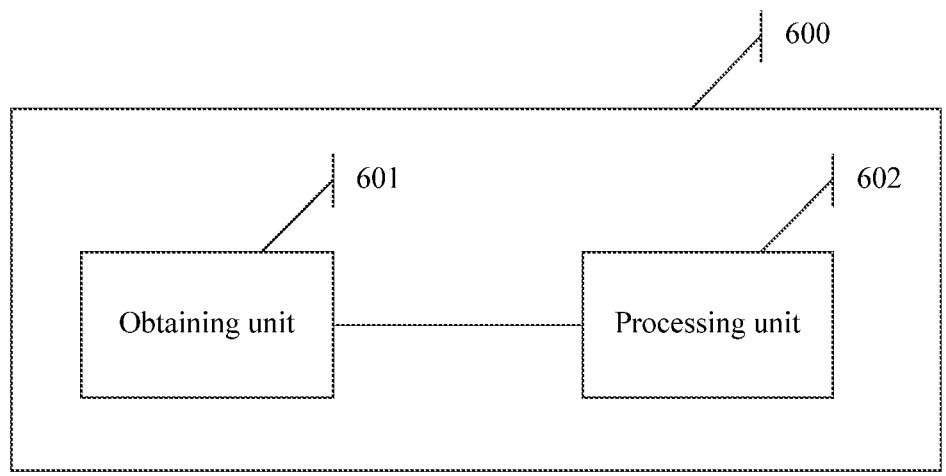
FIG. 6A and FIG. 6B each are a schematic structural diagram of another device monitoring apparatus according to an embodiment of this application.
Figure 6B:
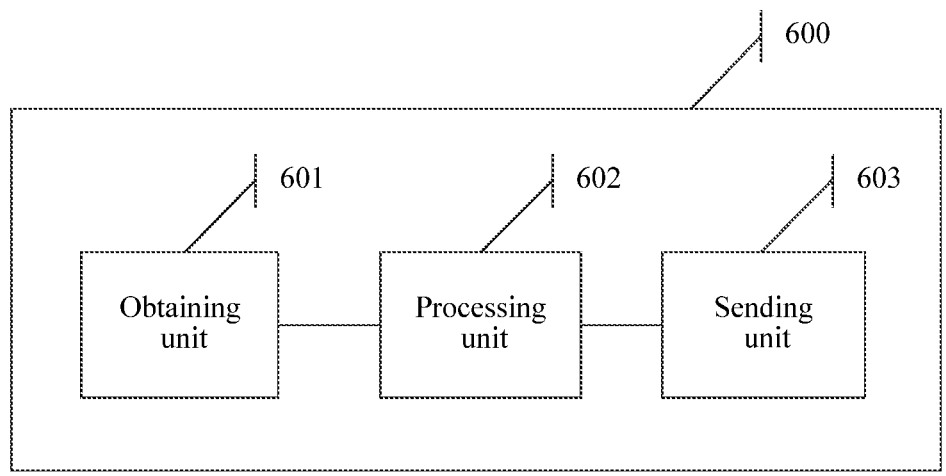

FIG. 6A and FIG. 6B each are a schematic structural diagram of a device monitoring apparatus 600. The device monitoring apparatus 600 may be a core network element, and can implement a function of the core network element in the method provided in the embodiments of this application. Alternatively, the device monitoring apparatus 600 may be an apparatus that can support an application server in implementing a function of the core network element in the method provided in the embodiments of this application. The device monitoring apparatus 600 may be a hardware structure, a software module, or a combination of a hardware structure and a software module. The device monitoring apparatus 600 may be implemented by using a chip system. In this embodiment of this application, the chip system may include a chip, or may include a chip and another discrete component.

The device monitoring apparatus 600 may include an obtaining unit 601 and a processing unit 602.

The obtaining unit 601 may be configured to perform step 305 in the embodiment shown in FIG. 3, and/or configured to support another process of the technology described in this specification. The obtaining unit 601 is used by the device monitoring apparatus 600 to communicate with another module, and may be a circuit, a component, an interface, a bus, a software module, a transceiver, or any other apparatus that can implement communication.

The processing unit 602 may be configured to perform step 306 in the embodiment shown in FIG. 3, and/or configured to support another process of the technology described in this specification.

In a possible implementation, as shown in FIG. 6B, the device monitoring apparatus 600 further includes a sending unit 603. The sending unit 603 may be configured to perform step 307 in the embodiment shown in FIG. 3, and/or configured to support another process of the technology described in this specification. The sending unit 603 is used by the device monitoring apparatus 600 to communicate with another module, and may be a circuit, a component, an interface, a bus, a software module, a transceiver, or any other apparatus that can implement communication.

All related content of the steps in the foregoing method embodiment may be cited in function descriptions of the corresponding functional modules. Details are not described herein again.

Figure 7A:
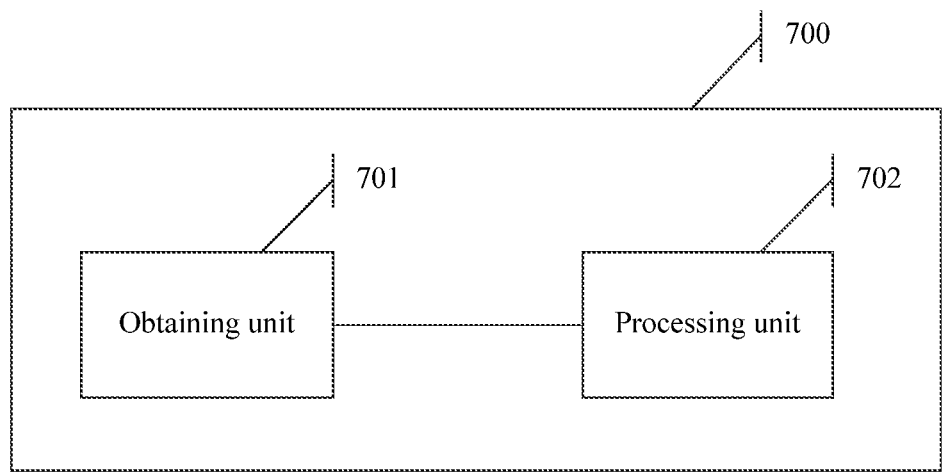
FIG. 7A and FIG. 7B each are a schematic structural diagram of a deregistration apparatus according to an embodiment of this application.
Figure 7B:
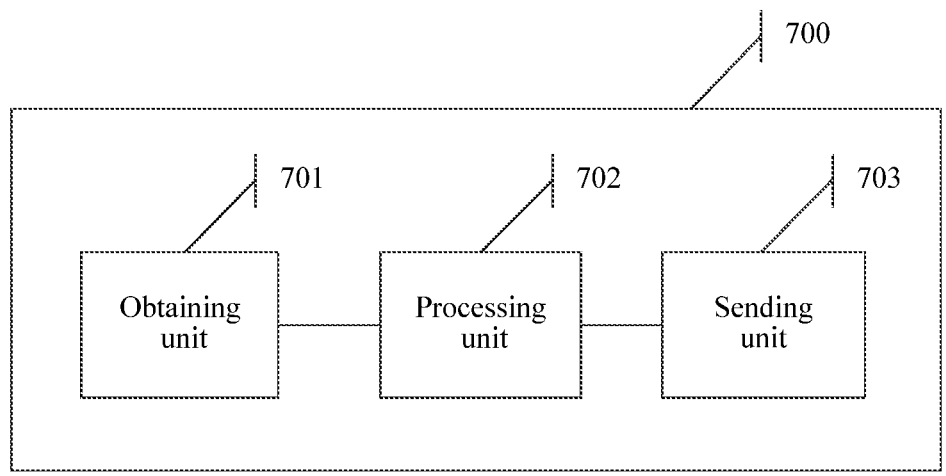

FIG. 7A and FIG. 7B each are a schematic structural diagram of a deregistration apparatus 700. The deregistration apparatus 700 may be a core network element, and can implement a function of the core network element in the method provided in the embodiments of this application. Alternatively, the deregistration apparatus 700 may be an apparatus that can support a core network element in implementing a function of the core network element in the method provided in the embodiments of this application. The deregistration apparatus 700 may be a hardware structure, a software module, or a combination of a hardware structure and a software module. The deregistration apparatus 700 may be implemented by using a chip system. In this embodiment of this application, the chip system may include a chip, or may include a chip and another discrete component.

The deregistration apparatus 700 may include an obtaining unit 701 and a processing unit 702.

The obtaining unit 701 may be configured to perform step 407 in the embodiment shown in FIG. 4A and FIG. 4B, and/or configured to support another process of the technology described in this specification. The obtaining unit 701 is used by the deregistration apparatus 700 to communicate with another module, and may be a circuit, a component, an interface, a bus, a software module, a transceiver, or any other apparatus that can implement communication.

The processing unit 702 may be configured to perform step 408 in the embodiment shown in FIG. 4A and FIG. 4B, and/or configured to support another process of the technology described in this specification.

In a possible implementation, as shown in FIG. 7B, the deregistration apparatus 700 further includes a sending unit 703. The sending unit 703 may be configured to perform step 411 in the embodiment shown in FIG. 4A and FIG. 4B, and/or configured to support another process of the technology described in this specification. The sending unit 703 is used by the deregistration apparatus 700 to communicate with another module, and may be a circuit, a component, an interface, a bus, a software module, a transceiver, or any other apparatus that can implement communication.

All related content of the steps in the foregoing method embodiment may be cited in function descriptions of the corresponding functional modules. Details are not described herein again.

Figure 8:
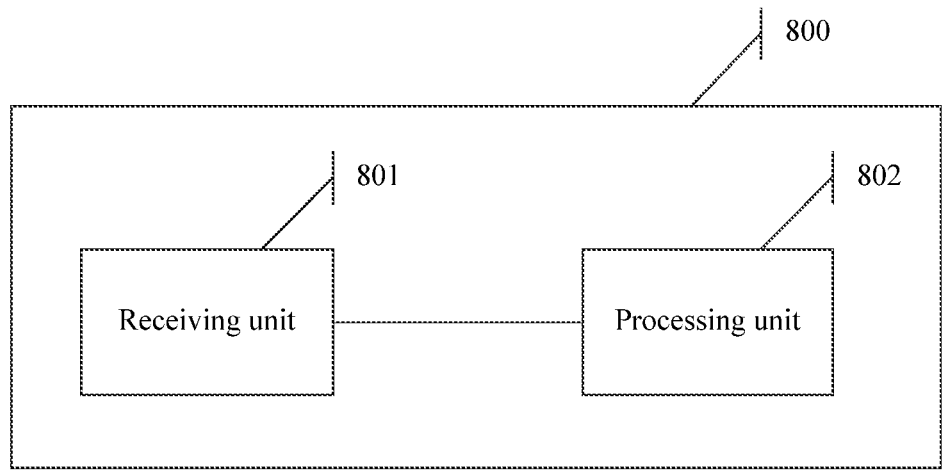
FIG. 8 is a schematic structural diagram of another device monitoring apparatus according to an embodiment of this application.

FIG. 8 is a schematic structural diagram of a device monitoring apparatus 800. The device monitoring apparatus 800 may be an application server, and can implement a function of the application server in the method provided in the embodiments of this application. Alternatively, the device monitoring apparatus 800 may be an apparatus that can support an application server in implementing a function of the application server in the method provided in the embodiments of this application. The device monitoring apparatus 800 may be a hardware structure, a software module, or a combination of a hardware structure and a software module. The device monitoring apparatus 800 may be implemented by using a chip system. In this embodiment of this application, the chip system may include a chip, or may include a chip and another discrete component.

The device monitoring apparatus 800 may include a receiving unit 801 and a processing unit 802.

The receiving unit 801 may be configured to perform step 411 in the embodiment shown in FIG. 4A and FIG. 4B, and/or configured to support another process of the technology described in this specification. The receiving unit 801 is used by the device monitoring apparatus 800 to communicate with another module, and may be a circuit, a component, an interface, a bus, a software module, a transceiver, or any other apparatus that can implement communication.

The processing unit 802 may be configured to perform step 412 or step 415 in the embodiment shown in FIG. 4A and FIG. 4B, and/or configured to support another process of the technology described in this specification.

All related content of the steps in the foregoing method embodiment may be cited in function descriptions of the corresponding functional modules. Details are not described herein again.

In the embodiments of this application, module division is an example, and is merely logical function division. In an actual implementation, there may be another division manner. In addition, functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 9:
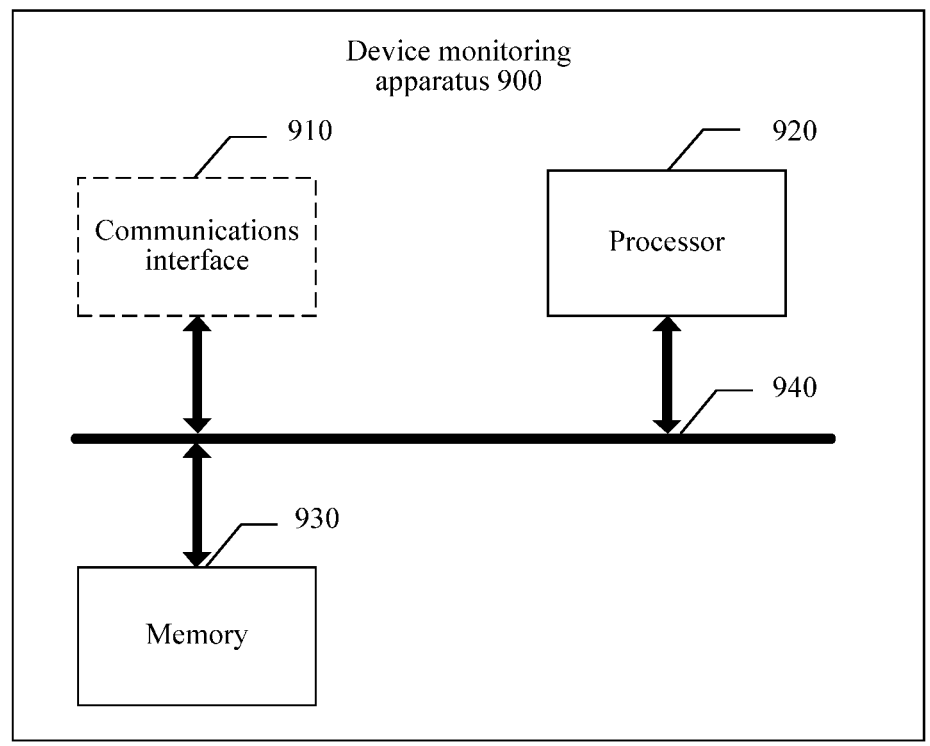
FIG. 9 is a schematic structural diagram of another device monitoring apparatus according to an embodiment of this application.

FIG. 9 shows a device monitoring apparatus 900 according to an embodiment of this application. The device monitoring apparatus 900 may be the application server in the embodiment shown in FIG. 2 or the core network element in the embodiment shown in FIG. 3, and can implement a function of the application server in the method provided in the embodiment shown in FIG. 2 of this application or a function of the core network element in the embodiment shown in FIG. 3. Alternatively, the device monitoring apparatus 900 may be an apparatus that can support an application server in implementing a function of the application server in the method provided in the embodiment shown in FIG. 2 of this application, or an apparatus that can support an application server in implementing a function of the core network element in the method provided in the embodiment shown in FIG. 3 of this application. The device monitoring apparatus 900 may be a chip system. In this embodiment of this application, the chip system may include a chip, or may include a chip and another discrete component.

The device monitoring apparatus 900 includes at least one processor 920, configured to implement or support the device monitoring apparatus 900 in implementing a function of the application server in the method provided in the embodiment shown in FIG. 2 of this application or implementing a function of the core network element in the method provided in the embodiment shown in FIG. 3 of this application. For example, the processor 920 may determine, based on attribute information of signaling plane data, whether a terminal device is a device that initiates a denial of service DoS attack. For details, refer to the detailed descriptions in the method example. Details are not described herein again.

The device monitoring apparatus 900 may further include at least one memory 930, configured to store a program instruction and/or data. The memory 930 is coupled to the processor 920. The coupling in this embodiment of this application is an indirect coupling or a communication connection between apparatuses, units, or modules, and may be in an electrical form, a mechanical form, or another form, and is used for information exchange between the apparatuses, the units, or the modules. The processor 920 may operate with the memory 930 together. The processor 920 may execute the program instruction stored in the memory 930. At least one of the at least one memory may be included in the processor. When executing the program instruction in the memory 930, the processor 920 may implement the method shown in FIG. 2 or FIG. 3.

The device monitoring apparatus 900 may further include a communications interface 910, configured to communicate with another device by using a transmission medium, so that an apparatus in the device monitoring apparatus 900 may communicate with another device. For example, the another device may be a terminal device. The processor 920 may send and receive data by using the communications interface 910.

In this embodiment of this application, a specific connection medium between the communications interface 910, the processor 920, and the memory 930 is not limited. In this embodiment of this application, the memory 930, the processor 920, and the communications interface 910 are connected by using a bus 940 in FIG. 9, and the bus is represented by a thick line in FIG. 9. A connection manner between other components is schematically described, and is not limited thereto. The bus may be classified into an address bus, a data bus, a control bus, and the like. For ease of representation, only one thick line is used to represent the bus in FIG. 9, but this does not mean that there is only one bus or only one type of bus.

In this embodiment of this application, the processor 920 may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in the embodiments of this application. The general-purpose processor may be a microprocessor or any conventional processor or the like. The steps of the method disclosed with reference to the embodiments of this application may be directly performed by using a hardware processor, or may be performed by using a combination of hardware in the processor and a software module.

In this embodiment of this application, the memory 930 may be a non-volatile memory such as a hard disk drive (HDD) or a solid-state drive (SSD), or may be a volatile memory such as a random access memory (RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store a program instruction and/or data.

Figure 10:
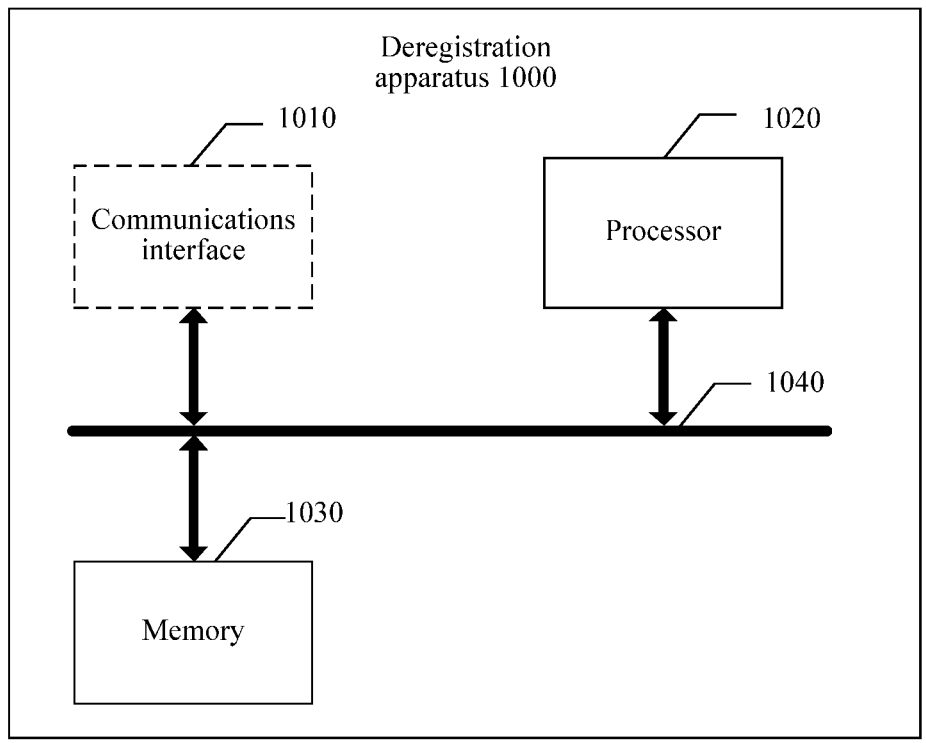
FIG. 10 is a schematic structural diagram of a deregistration apparatus according to an embodiment of this application.

FIG. 10 shows a deregistration apparatus 100 according to an embodiment of this application. The deregistration apparatus 100 may be a core network element, and can implement a function of the core network element in the method provided in the embodiments of this application. Alternatively, the deregistration apparatus 1000 may be an apparatus that can support a core network element in implementing a function of the core network element in the method provided in the embodiments of this application. The deregistration apparatus 1000 may be a chip system. In this embodiment of this application, the chip system may include a chip, or may include a chip and another discrete component.

The deregistration apparatus 100 includes at least one processor 1020, configured to implement or support the deregistration apparatus 1000 in implementing a function of the core network element in the method provided in the embodiments of this application. For example, the processor 1020 may deregister N terminal devices in M terminal devices. For details, refer to the detailed descriptions in the method example. Details are not described herein again.

The deregistration apparatus 100 may further include at least one memory 1030, configured to store a program instruction and/or data. The memory 1030 is coupled to the processor 1020. The coupling in this embodiment of this application is an indirect coupling or a communication connection between apparatuses, units, or modules, and may be in an electrical form, a mechanical form, or another form, and is used for information exchange between the apparatuses, the units, or the modules. The processor 1020 may operate with the memory 1030 together. The processor 1020 may execute the program instruction stored in the memory 1030. At least one of the at least one memory may be included in the processor. When executing the program instruction in the memory 1030, the processor 1020 may implement the method shown in FIG. 4A and FIG. 4B.

The deregistration apparatus 100 may further include a communications interface 1010, configured to communicate with another device by using a transmission medium, so that an apparatus in the deregistration apparatus 1000 may communicate with the another device. For example, the another device may be a terminal device. The processor 1020 may send and receive data by using the communications interface 1010.

In this embodiment of this application, a specific connection medium between the communications interface 1010, the processor 1020, and the memory 1030 is not limited. In this embodiment of this application, the memory 1030, the processor 1020, and the communications interface 1010 are connected by using a bus 1040 in FIG. 10, and the bus is represented by a thick line in FIG. 10. A connection manner between other components is schematically described, and is not limited thereto. The bus may be classified into an address bus, a data bus, a control bus, and the like. For ease of representation, only one thick line is used to represent the bus in FIG. 10, but this does not mean that there is only one bus or only one type of bus.

In this embodiment of this application, the processor 1020 may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in the embodiments of this application. The general-purpose processor may be a microprocessor or any conventional processor or the like. The steps of the method disclosed with reference to the embodiments of this application may be directly performed by using a hardware processor, or may be performed by using a combination of hardware in the processor and a software module.

In this embodiment of this application, the memory 1030 may be a non-volatile memory, such as a hard disk drive (HDD) or a solid-state drive (SSD), or may be a volatile memory, such as a random access memory (RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store a program instruction and/or data.

Figure 11:
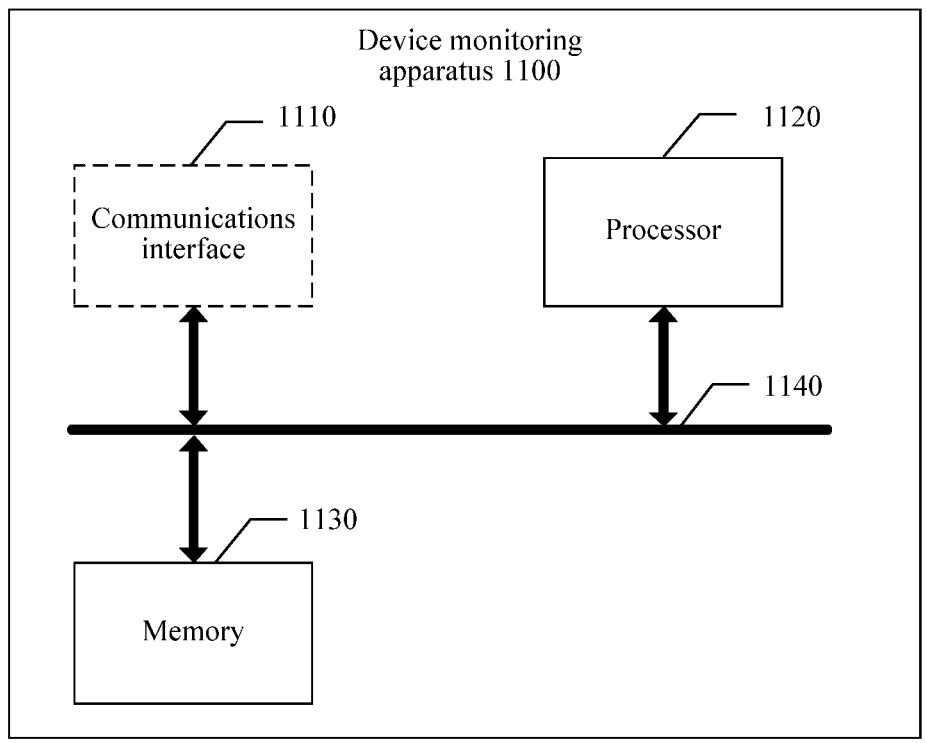
FIG. 11 is a schematic structural diagram of another device monitoring apparatus according to an embodiment of this application.

FIG. 11 shows a device monitoring apparatus 1100 according to an embodiment of this application. The device monitoring apparatus 1100 may be the application server in the embodiment shown in FIG. 4A and FIG. 4B, and can implement a function of the application server in the method provided in the embodiment shown in FIG. 4A and FIG. 4B of this application. Alternatively, the device monitoring apparatus 1100 may be an apparatus that can support an application server in implementing a function of the application server in the method provided in the embodiment shown in FIG. 4A and FIG. 4B of this application. The device monitoring apparatus 1100 may be a chip system. In this embodiment of this application, the chip system may include a chip, or may include a chip and another discrete component.

The device monitoring apparatus 1100 includes at least one processor 1120, configured to implement or support the device monitoring apparatus 1100 in implementing a function of the application server in the method provided in the embodiment shown in FIG. 4A and FIG. 4B of this application. For example, the processor 1120 may determine, based on a received first message and location information of N terminal devices, that K terminal devices in the N terminal devices are devices that initiate a denial of service DoS attack. For details, refer to the detailed descriptions in the method example. Details are not described herein again.

The device monitoring apparatus 1100 may further include at least one memory 1130, configured to store a program instruction and/or data. The memory 1130 is coupled to the processor 1120. The coupling in this embodiment of this application is an indirect coupling or a communication connection between apparatuses, units, or modules, and may be in an electrical form, a mechanical form, or another form, and is used for information exchange between the apparatuses, the units, or the modules. The processor 1120 may operate with the memory 1130 together. The processor 1120 may execute the program instruction stored in the memory 1130. At least one of the at least one memory may be included in the processor. When executing the program instruction in the memory 1130, the processor 1120 may implement the method shown in FIG. 4A and FIG. 4B.

The device monitoring apparatus 1100 may further include a communications interface 1110, configured to communicate with another device by using a transmission medium, so that an apparatus in the device monitoring apparatus 1100 may communicate with the another device. For example, the another device may be a terminal device. The processor 1120 may send and receive data by using the communications interface 1110.

A specific connection medium between the communications interface 1110, the processor 1120, and the memory 1130 is not limited in this embodiment of this application. In this embodiment of this application, the memory 1130, the processor 1120, and the communications interface 1110 are connected by using a bus 1140 in FIG. 11, and the bus is represented by a thick line in FIG. 11. A connection manner between other components is schematically described, and is not limited thereto. The bus may be classified into an address bus, a data bus, a control bus, and the like. For ease of representation, only one thick line is used to represent the bus in FIG. 11, but this does not mean that there is only one bus or only one type of bus.

In this embodiment of this application, the processor 1120 may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in the embodiments of this application. The general-purpose processor may be a microprocessor or any conventional processor or the like. The steps of the method disclosed with reference to the embodiments of this application may be directly performed by using a hardware processor, or may be performed by using a combination of hardware in the processor and a software module.

In this embodiment of this application, the memory 1130 may be a non-volatile memory, such as a hard disk drive (HDD) or a solid-state drive (SSD), or may be a volatile memory (volatile memory), such as a random access memory (RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store a program instruction and/or data.

An embodiment of this application further provides a computer-readable storage medium, including an instruction. When the instruction is run on a computer, the computer is enabled to perform the method performed by the application server according to any one of the embodiments in FIG. 2 to FIG. 4A and FIG. 4B.

An embodiment of this application further provides a computer-readable storage medium, including an instruction. When the instruction is run on a computer, the computer is enabled to perform the method performed by the core network element according to any one of the embodiments in FIG. 2 to FIG. 4A and FIG. 4B.

An embodiment of this application provides a chip system. The chip system includes a processor, and may further include a memory, and is configured to implement a function of the application server in the foregoing method. The chip system may include a chip, or may include a chip and another discrete component.

An embodiment of this application provides a chip system. The chip system includes a processor, and may further include a memory, and is configured to implement a function of the core network element in the foregoing method. The chip system may include a chip, or may include a chip and another discrete component.

An embodiment of this application provides a chip system. The chip system includes a processor, may further include a memory, and is configured to implement a function of the terminal device in the foregoing method. The chip system may include a chip, or may include a chip and another discrete component.

An embodiment of this application provides a system. The system includes the foregoing application server and the core network element.

All or some of the foregoing methods in the embodiments of this application may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, a network device, user equipment, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or a microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, an SSD), or the like.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, comprising:
   receiving, from an access and mobility management function (AMF) network element, signaling plane data exchanged between a terminal device and a core network element;
   obtaining location information of the terminal device; and
   determining, based on the location information of the terminal device and attribute information of the signaling plane data, whether the terminal device has initiated a denial of service (DoS) attack.

2. The method according to claim 1, wherein the attribute information comprises an amount of the signaling plane data or a length of the signaling plane data.

3. The method according to claim 2, wherein the attribute information comprises the amount of the signaling plane data, and determining, based on the location information of the terminal device and the attribute information of the signaling plane data, whether the terminal device has initiated a DoS attack comprises:
   determining, based on the location information of the terminal device and the amount of the signaling plane data being greater than or equal to a threshold, that the terminal device has initiated a DoS attack.

4. The method according to claim 2, wherein the attribute information comprises the length of the signaling plane data, and determining, based on the location information of the terminal device and the attribute information of the signaling plane data, whether the terminal device has initiated a DoS attack comprises:
   determining, based on the location information of the terminal device and the length of the signaling plane data being greater than or equal to a preset length, that the terminal device has initiated a DoS attack.

5. An apparatus, comprising:
   a processor; and
   a non-transitory computer-readable storage medium storing a program to be executed by the processor, the program including instructions for:
      receiving, from an access and mobility management function (AMF) network element, signaling plane data exchanged between a terminal device and a core network element;
      obtaining location information of the terminal device; and
      determining, based on the location information of the terminal device and attribute information of the signaling plane data, whether the terminal device has initiated a denial of service (DoS) attack.

6. The apparatus according to claim 5, wherein the attribute information comprises an amount of the signaling plane data or a length of the signaling plane data.

7. The apparatus according to claim 6, wherein the attribute information comprises the amount of the signaling plane data, and the program further includes instructions for:
   determining, based on the location information of the terminal device and the amount of the signaling plane data being greater than or equal to a threshold, that the terminal device has initiated a DoS attack.

8. The apparatus according to claim 6, wherein the attribute information comprises the length of the signaling plane data, and the program includes instructions for:
   determining, based on the location information of the terminal device and the length of the signaling plane data being greater than or equal to a preset length, that the terminal device has initiated a DoS attack.

9. A non-transitory computer readable storage medium storing a program that is executable by a processor, the program including instructions for:
   receiving, from an access and mobility management function (AMF) network element, signaling plane data exchanged between a terminal device and a core network element;
   obtaining location information of the terminal device; and
   determining, based on the location information of the terminal device and attribute information of the signaling plane data, whether the terminal device has initiated a denial of service (DoS) attack.

10. The non-transitory computer readable storage medium according to claim 9, wherein the attribute information comprises an amount of the signaling plane data or a length of the signaling plane data.

11. The non-transitory computer readable storage medium according to claim 10, wherein the attribute information comprises the amount of the signaling plane data, and the program further includes instructions for:
    determining, based on the location information of the terminal device and the amount of the signaling plane data being greater than or equal to a threshold, that the terminal device has initiated a DoS attack.

12. The non-transitory computer readable storage medium according to claim 10, wherein the attribute information comprises the length of the signaling plane data, and the program includes instructions for:
    determining, based on the location information of the terminal device and the length of the signaling plane data being greater than or equal to a preset length, that the terminal device has initiated a DoS attack.

13. The non-transitory computer readable storage medium according to claim 9, wherein the program further includes instructions for:
    sending a monitoring request message, wherein the monitoring request message configures a monitoring event of the core network element for the terminal device.

14. The non-transitory computer readable storage medium according to claim 13, wherein the monitoring request message comprises:
    the attribute information of the signaling plane data exchanged between the terminal device and the core network element.

15. The non-transitory computer readable storage medium according to claim 14, wherein the monitoring request message further comprises:
    a monitoring duration.

16. The non-transitory computer readable storage medium according to claim 14, wherein the monitoring request message further comprises:
an identifier of the terminal device.

* * * * *